US012223767B2

United States Patent
Joseph et al.

(10) Patent No.: US 12,223,767 B2
(45) Date of Patent: Feb. 11, 2025

(54) SYSTEMS AND METHODS OF IMAGE PROCESSING FOR PRIVACY MANAGEMENT

(71) Applicant: QUALCOMM Incorporated, San Diego, CA (US)

(72) Inventors: Binil Francis Joseph, Hyderabad (IN); Bapineedu Chowdary Gummadi, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 391 days.

(21) Appl. No.: 17/725,160

(22) Filed: Apr. 20, 2022

(65) Prior Publication Data
US 2023/0342487 A1 Oct. 26, 2023

(51) Int. Cl.
*G06V 40/16* (2022.01)
*G06N 20/00* (2019.01)
*G06F 21/62* (2013.01)
*G06T 11/60* (2006.01)

(52) U.S. Cl.
CPC ........... *G06V 40/166* (2022.01); *G06N 20/00* (2019.01); *G06V 40/16* (2022.01); *G06V 40/172* (2022.01); *G06F 21/6245* (2013.01); *G06T 11/60* (2013.01)

(58) Field of Classification Search
USPC ........................................................ 382/118
See application file for complete search history.

(56) References Cited

U.S. PATENT DOCUMENTS

| | | | | |
|---|---|---|---|---|
| 11,282,278 B1 * | 3/2022 | Zavesky | ............... | G06T 19/003 |
| 11,335,069 B1 * | 5/2022 | Savchenkov | ......... | G06T 11/001 |
| 2019/0266390 A1 | 8/2019 | Gusarov et al. | | |
| 2020/0402304 A1 * | 12/2020 | Hwang | .................. | G06T 7/168 |

OTHER PUBLICATIONS

International Search Report and Written Opinion—PCT/US2023/065464—ISA/EPO—Jun. 27, 2023.

* cited by examiner

*Primary Examiner* — Jacky X Zheng
(74) *Attorney, Agent, or Firm* — QUALCOMM Incorporated

(57) ABSTRACT

Systems and techniques are described for processing one or more images. For example, an imaging system may receive an image of an environment and detect a face of a person in the image. The imaging system may identify profile data associated with the person and retrieve, based on the profile data, a synthesized face. The imaging system may generate a modified image of the environment at least in part by modifying the image to use the synthesized face for the person in place of the face of the person. The imaging system may further output the modified image of the environment. In some examples, the imaging system uses trained machine learning model(s) to generate the modified image.

30 Claims, 16 Drawing Sheets

SYSTEMS AND METHODS OF IMAGE PROCESSING FOR PRIVACY MANAGEMENT

FIELD

This application is related to image processing. For example, aspects of this application are related to systems and techniques for image processing to modify an image of an environment that depicts a person to use a synthesized face corresponding to a profile of the person in place of the real face of the person in the image.

BACKGROUND

Network-based interactive systems allow users to interact with one another over a network, in some cases even when those users are geographically remote from one another. Network-based interactive systems can include video conferencing technologies. In a video conference, each user connects through a user device that captures video and/or audio of the user and sends the video and/or audio to the other users in the video conference, so that each of the users in the video conference can see and hear one another. Network-based interactive systems can include network-based multiplayer games, such as massively multiplayer online (MMO) games. Network-based interactive systems can include extended reality (XR) technologies, such as virtual reality (VR) or augmented reality (AR). At least a portion of an XR environment displayed to a user of an XR device can be virtual, in some examples including representations of other users that the user can interact with in the XR environment.

In some examples, network-based interactive systems may use cameras to obtain image data of a user and/or portions of the real-world environment that the user is in. In some examples, network-based interactive systems send this image data to other users. However, sending of image data that may include representations of users and/or of other persons in an environment raises privacy concerns, as some of those persons might not want for an image of them to be captured and/or shared.

SUMMARY

In some examples, systems and techniques are described for image processing. An imaging system receives an image of an environment, and detects a face of a person in the image. The imaging system identifies a profile associated with the person, for instance based on facial recognition and/or communication(s) from the person's device. The imaging system retrieves, from the profile of the person, a synthesized face that corresponds to the person and that is distinct from the face of the person. In some examples, the imaging system generates the synthesized face using trained machine learning model(s) and stores the synthesized face in the profile before this retrieval. The imaging system generates a modified image at least in part by modifying the image to use the synthesized face for the person in place of the face of the person, and outputs the modified image. In some examples, the imaging system uses trained machine learning model(s) to generate the modified image, for instance to ensure that the synthesized face looks realistic on, and blends into, the rest of the body of the person as depicted in the image.

In one example, an apparatus for processing one or more images is provided. The apparatus includes at least one memory and at least one processor (e.g., implemented in circuitry) coupled to the at least one memory. The at least one processor is configured to: receive an image of an environment; detect, in the image, a face of a person; identify profile data associated with the person; retrieve, based on the profile data, a synthesized face; generate a modified image of the environment at least in part by modifying the image to use the synthesized face for the person in place of the face of the person; and output the modified image of the environment.

In another example, a method of processing one or more images is provided. The method includes: receiving an image of an environment; detecting, in the image, a face of a person; identifying profile data associated with the person; retrieving, based on the profile data, a synthesized face; generating a modified image of the environment at least in part by modifying the image to use the synthesized face for the person in place of the face of the person; and outputting the modified image of the environment.

In another example, a non-transitory computer-readable medium is provided that has stored thereon instructions that, when executed by one or more processors, cause the one or more processors to: receive an image of an environment; detect, in the image, a face of a person; identify profile data associated with the person; retrieve, based on the profile data, a synthesized face; generate a modified image of the environment at least in part by modifying the image to use the synthesized face for the person in place of the face of the person; and output the modified image of the environment.

In another example, an apparatus for image processing is provided. The apparatus includes: means for receiving an image of an environment; means for detecting, in the image, a face of a person; means for identifying profile data associated with the person; means for retrieving, based on the profile data, a synthesized face; means for generating a modified image of the environment at least in part by modifying the image to use the synthesized face for the person in place of the face of the person; and means for outputting the modified image of the environment.

In some aspects, the apparatus is part of, and/or includes a wearable device, an extended reality device (e.g., a virtual reality (VR) device, an augmented reality (AR) device, or a mixed reality (MR) device), a head-mounted display (HMD) device, a wireless communication device, a mobile device (e.g., a mobile telephone and/or mobile handset and/or so-called "smart phone" or other mobile device), a camera, a personal computer, a laptop computer, a server computer, a vehicle or a computing device or component of a vehicle, another device, or a combination thereof. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors (e.g., one or more inertial measurement units (IMUs), such as one or more gyroscopes, one or more gyrometers, one or more accelerometers, any combination thereof, and/or other sensor).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative aspects of the present application are described in detail below with reference to the following drawing figures.

DETAILED DESCRIPTION

Figure 1:
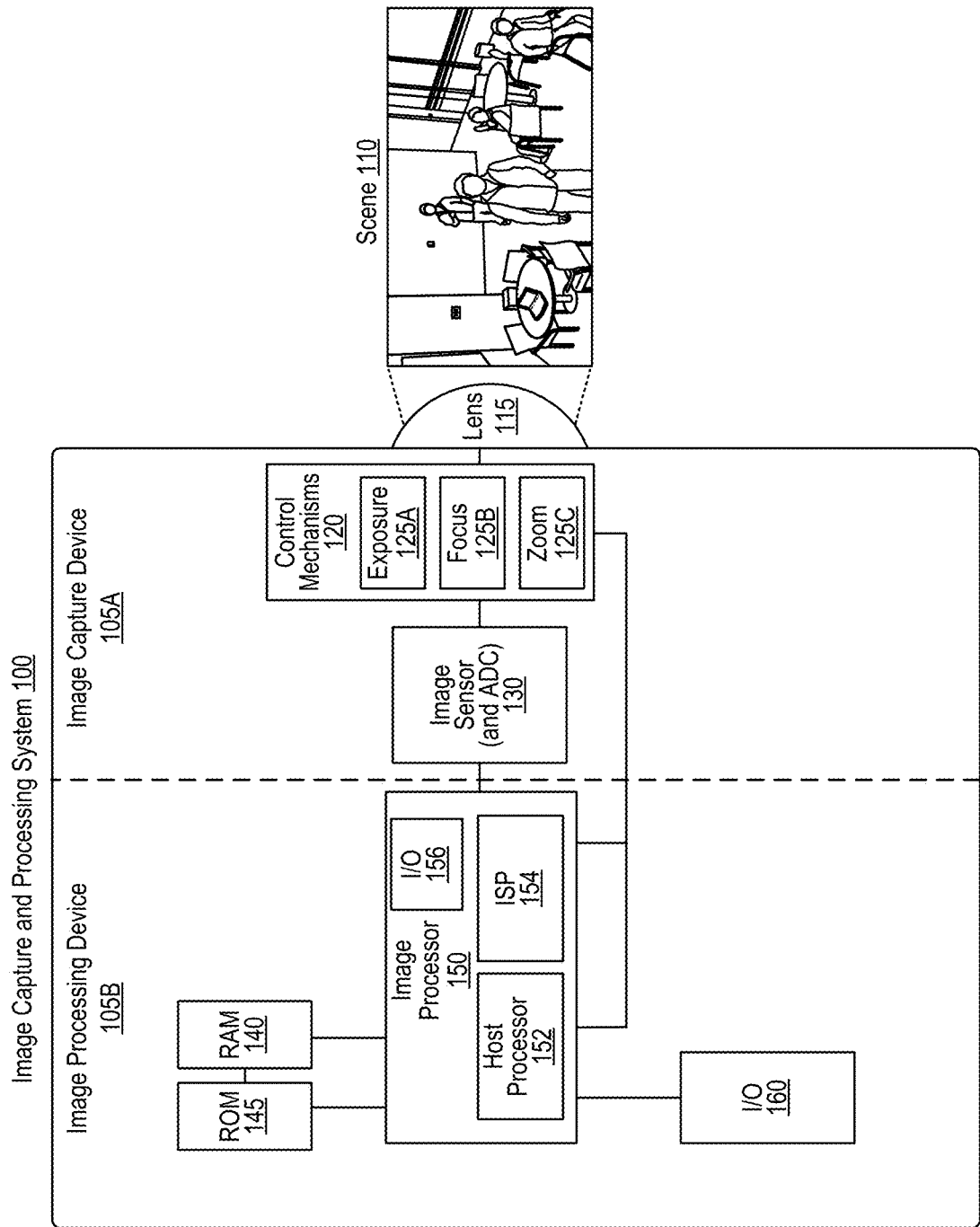
FIG. 1 is a block diagram illustrating an example architecture of an image capture and processing system, in accordance with some examples.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

A camera is a device that receives light and captures image frames, such as still images or video frames, using an image sensor. The terms "image," "image frame," and "frame" are used interchangeably herein. Cameras can be configured with a variety of image capture and image processing settings. The different settings result in images with different appearances. Some camera settings are determined and applied before or during capture of one or more image frames, such as ISO, exposure time, aperture size, f/stop, shutter speed, focus, and gain. For example, settings or parameters can be applied to an image sensor for capturing the one or more image frames. Other camera settings can configure post-processing of one or more image frames, such as alterations to contrast, brightness, saturation, sharpness, levels, curves, or colors. For example, settings or parameters can be applied to a processor (e.g., an image signal processor or ISP) for processing the one or more image frames captured by the image sensor.

Extended reality (XR) systems or devices can provide virtual content to a user and/or can combine real-world views of physical environments (scenes) and virtual environments (including virtual content). XR systems facilitate user interactions with such combined XR environments. The real-world view can include real-world objects (also referred to as physical objects), such as people, vehicles, buildings, tables, chairs, and/or other real-world or physical objects. XR systems or devices can facilitate interaction with different types of XR environments (e.g., a user can use an XR system or device to interact with an XR environment). XR systems can include virtual reality (VR) systems facilitating interactions with VR environments, augmented reality (AR) systems facilitating interactions with AR environments, mixed reality (MR) systems facilitating interactions with MR environments, and/or other XR systems. Examples of XR systems or devices include head-mounted displays (HMDs), smart glasses, among others. In some cases, an XR system can track parts of the user (e.g., a hand and/or fingertips of a user) to allow the user to interact with items of virtual content.

Video conferencing is a network-based technology that allows multiple users, who may each be in different locations, to connect in a video conference over a network using respective user devices that generally each include displays and cameras. In video conferencing, each camera of each user device captures image data representing the user who is using that user device, and sends that image data to the other user devices connected to the video conference, to be displayed on the display of the other users who use those other user devices. Meanwhile, the user device displays image data representing the other users in the video conference, captured by the respective cameras of the other user devices that those other users use to connect to the video conference. Video conferencing can be used by a group of users to virtually speak face-to-face while users are in different locations. Video conferencing can be a valuable way to users to virtually meet with each other despite travel restrictions, such as those related to a pandemic. Video conferencing can be performed using user devices that connect to each other, in some cases through one or more servers. In some examples, the user devices can include laptops, phones, tablet computers, mobile handsets, video game consoles, vehicle computers, desktop computers, wearable devices, televisions, media centers, XR systems, or other computing devices discussed herein.

Network-based interactive systems allow users to interact with one another over a network, in some cases even when those users are geographically remote from one another. Network-based interactive systems can include video conferencing technologies such as those described above. In a video conference, each user connects through a user device that captures video and/or audio of the user and sends the video and/or audio to the other users in the video conference, so that each of the users in the video conference can see and hear one another. Network-based interactive systems can include extended reality (XR) technologies, such as those described above. At least a portion of an XR environment displayed to a user of an XR device can be virtual, in some examples including representations of other users that the user can interact with in the XR environment. Network-based interactive systems can include network-based multiplayer games, such as massively multiplayer online (MMO) games. Network-based interactive systems can include network-based interactive environment, such as "metaverse" environments.

In some examples, network-based interactive systems may use cameras to obtain image data of a user and/or portions of the real-world environment that the user is in. In some examples, network-based interactive systems send this image data to other users. However, sending of image data that may include representations of users and/or of other persons in an environment raises privacy concerns, as some of those persons might not want for an image of them (e.g., of their faces and/or other portion(s) of their respective bodies) to be captured and/or shared by the network-based interactive systems. For instance, a user may be using a network-based interactive system outdoors, in a coffeeshop, in a store, at home, at an office, or at a school. In each of these cases, the camera(s) of the network-based interactive system may end up capturing image data of other persons besides the user, for instance as those persons may end up walking into the field of view of the camera(s), or the field of view of the camera(s) may move (e.g., as the user moves their head while wearing an HMD that is part of the network-based interactive system) to include the persons. For certain persons, such as children, privacy laws in certain countries or regions may prohibit or otherwise regulate image capture and/or sharing using such network-based interactive systems. In some network-based interactive systems, such as those including head-mounted display (HMD) devices, it may be difficult for a user to control the field of view of camera(s) to prevent capture of image data of other persons. In some cases, the user himself/herself may not want his/her image to be shared using a network-based interactive system, for instance if the user has not yet gotten ready for the day, is having a bad hair day, is feeling sick or unwell, is wearing an outfit (e.g., pajamas) that they would prefer not to share, is eating while using the network-based interactive system, or some combination thereof.

In some examples, network-based interactive systems may modify the image data to protect the privacy of the user and/or other persons who are depicted or otherwise represented in the image data. In some examples, a network-based interactive system may blur or pixelate a person's face in the image to protect the privacy of the person (e.g., see FIG. 6A). In some examples, a network-based interactive system may cover a person's face in the image (e.g., with a black box or a cartoony avatar face) to protect the privacy of the person (e.g., see FIGS. 6B-6C). In some examples, a network-based interactive system may use inpainting to effectively remove a person and/or their face from the image to protect the privacy of the person (e.g., see FIG. 6D). However, all of these solutions can make the persons, and this the interactive environment that they are in, no longer look realistic, breaking immersion for the user of the network-based interactive system. For instance, an image of an environment does not look like a realistic environment if people in the environment have faces that are blurry, pixelated, covered in a black box, or covered in a cartoony avatar face such as a smiley face. Similarly, inpainting often produces visual artifacts, and can look inconsistent from one video frame to the next, likewise breaking immersion in the environment for users.

In some examples, one or more machine learning models can be trained (resulting in one or more trained machine learning models), using training data with numerous input images of human faces, to generate realistic synthesized faces. In some cases, the trained machine learning model(s) can extract features and/or attributes from the various faces in the input images and combine the extracted features and/or attributes in new ways to generate the realistic synthesized faces. In some examples, a synthesized face generated by the trained machine learning model(s) can look like a real human face, with correct features and proportions, but be unique from any of the human faces in the training data, and not be representative of any real person. In some examples, the trained machine learning model(s) can include one or more generative adversarial networks (GANs) and/or other deep-learning (DL) based generative ML model(s). In some aspects, in some examples, a pre-generated synthesized face may be used for replacement. A synthesized face can also be referred to as a synthetic face, an artificial face, a replacement face, a secondary face, or a combination thereof.

In some examples, systems and techniques are described for image processing. An imaging system receives an image of an environment, and detects a face of a person in the image. The imaging system identifies a profile associated with the person, for instance based on facial recognition and/or communication(s) from the person's device. The imaging system retrieves, from the profile of the person, a synthesized face that corresponds to the person and that is distinct from the face of the person. In some examples, the imaging system generates the synthesized face using trained machine learning model(s) and stores the synthesized face in the profile before this retrieval. The imaging system generates a modified image at least in part by modifying the image to use the synthesized face for the person in place of the face of the person, and outputs the modified image. In some examples, the imaging system uses trained machine learning model(s) to generate the modified image, for instance to ensure that the synthesized face looks realistic on, and blends into, the rest of the body of the person as depicted in the image.

In an illustrative example, a user of an imaging system (e.g., XR system) can travel into a shop, a concert, or another area in an environment that is at least partially virtual. In addition to the user themselves, other people may be in the area, and pedestrians may be passing by the area. However, not all of these users may wish to have their real faces shown publicly to all users of the imaging system. For each person that the user sees in the area in the environment, the imaging system generates a synthesized face, for instance using a GAN. The imaging system uses the synthesized face in place of the person's real face, for instance using a trained ML model to replace or superimpose the synthesized face over the person's real face and blend the synthesized face realistically into the rest of the person's body and/or to environment, for instance to account for lighting in the environment, orientation of the person's head, facial expression that the person is making, and the like. The imaging system displays the modified view of the environment to the user of the imaging system. In the illustrative example discussed above, the user of the imaging system may see a modified view of the area in the environment, in which the other people in the shop have synthesized faces. Thus, the other people in the interactive environment have their privacy preserved, but immersion is not broken for the user of the imaging system, since the people in the interactive environment still look like real human beings rather than people with unnaturally blurred, pixelized, or covered faces.

In some examples, the imaging system can generate the synthesized face so that the skin tone of the synthesized face corresponds to the person's natural skin tone. This ensures that the skin tone of the synthesized face does not clash with the skin tone of other parts of the user's body that may be visible in the image (e.g., hands, arms, legs, neck, feet, etc.). This can ensure that immersion is not broken. In some examples, the imaging system can alter the skin tone of other parts of the user's body that are visible in the image (e.g., hands, arms, legs, neck, feet, etc.) to match the skin tone of the synthesized face. This can increase privacy further, for instance so that the user does not even know the original skin tone of the person, but can increase the risk of visual artifacts, for instance if the imaging system misclassifies an object in the image as being a body part of the person (e.g., causing the imaging system to incorrectly modify the object's color and/or tone), or if the imaging system fails to recognize a body part of the person (e.g., causing the imaging system to fail to modify the skin tone of the body part).

In some examples, a profile of a user or other person may include preferences corresponding to how and when their synthesized face "disguise" is applied. In some examples, the user's preferences may include an approved list (whitelist) of certain users of the interactive environment (e.g., family and/or friends) who are permitted to see their true face, while the user appears disguised with a synthesized face (as described above) for anyone else. In some examples, the user's preferences may include a blocked list (blacklist) of certain users of the interactive environment who are not permitted to see their true face (e.g., people they dislike or wish to hide from) for which the user appears disguised with a synthesized face (as described above), while the user appears with their true face for anyone else.

In some examples, the user's settings may also be based on where in the interactive environment the user is located. For instance, if user's settings may include an approved list (whitelist) of certain locations in the interactive environment (e.g., their home in the interactive environment) where anyone visiting is permitted to see their true face, while the user appears disguised with a synthesized face (e.g., as described herein) anywhere else in the interactive environment. In some examples, the user's settings may include a blocked list (blacklist) of certain locations in the interactive environment where their true face is not permitted to be shown (e.g., very public areas) for which the user appears disguised with a synthesized face (e.g., as described herein), while the user appears with their true face anywhere else in the interactive environment.

In some examples, each person in the interactive environment—user or bystander—may have a profile. The imaging system can generate a synthesized face for each person (e.g., as described above), which may be stored in the person's profile. The person's settings, if there are any, may be stored in the profile. In some examples, when a new person is detected, a profile may be created for the person by the imaging system, with a synthesized face corresponding to the person and/or default settings for the person. The person's true face, or features extracted therefrom, may be included, so that the system can consistently detect, recognize, and/or track the person throughout interactive environments. In this way, the same person may have the same synthesized face regardless of when and where they are seen. This can preserve immersion for a user of the interactive environment—for instance, if the user briefly looks away from a person and then looks back, the person will still have the same synthesized face because their profile stores that synthesized face for them, rather than having their face suddenly change to a different synthesized face, which would break immersion. In some examples, default settings can indicate that the imaging system is to always replace the person's face with a corresponding synthesized face (e.g., to maximize privacy), to never replace the person's face with the corresponding synthesized face (e.g., to minimize image processing time, energy, and compute resources), or to have predetermined approved lists and/or block lists indicating when to replace the person's face with the corresponding synthesized face and/or when not to. In some cases, a new synthesized face can be re-generated for each person's profile periodically (e.g., every week, every day, every few hours, every few minutes) to prevent a malicious user from trying to stalk another person in the interactive environment based on a consistent synthesized face for that person. In some examples, a new synthesized face can be re-generated for each person's profile aperiodically. For instance, if a person spends a long period of time (e.g., five hours in a day, two hours a day for three days in a row, etc.) in the immersive environment, then the imaging system can re-generate the face more frequently (e.g., in a particular day, every day for three days, etc.). In another example of aperiodic re-generation of a new synthesized face, if a person is inactive for a period of time (e.g., inactive for at least two, three, or other number of days, inactive for a week or more, etc.), then the imaging system can re-generate the face less frequently (e.g., once a week, once every two weeks, etc.).

The imaging systems and techniques described herein provide a number of technical improvements over prior imaging systems. For instance, the imaging systems and techniques described herein provide increased privacy and security for network-based interactive systems and/or other imaging systems at least in part by alternate faces (e.g., synthesized faces) for persons depicted in image data. The imaging systems and techniques described herein provide increased immersion, and/or do not detract from immersion, compared to other privacy-enhancing techniques such as face blurring, face pixelization, covering faces with black boxes, covering faces with cartoon avatar faces, inpainting, or combinations thereof.

Various aspects of the application will be described with respect to the figures. FIG. 1 is a block diagram illustrating an architecture of an image capture and processing system 100. The image capture and processing system 100 includes various components that are used to capture and process images of one or more scenes (e.g., an image of a scene 110). The image capture and processing system 100 can capture standalone images (or photographs) and/or can capture videos that include multiple images (or video frames) in a particular sequence. A lens 115 of the system 100 faces a scene 110 and receives light from the scene 110. The lens 115 bends the light toward the image sensor 130. The light received by the lens 115 passes through an aperture controlled by one or more control mechanisms 120 and is received by an image sensor 130. In some examples, the scene 110 is a scene in an environment. In some examples, the scene 110 is a scene of at least a portion of a user. For instance, the scene 110 can be a scene of one or both of the user's eyes, and/or at least a portion of the user's face.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo, thereby adjusting focus. In some cases, additional lenses may be included in the system 100, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), or some combination thereof. The focus setting may be determined using the control mechanism 120, the image sensor 130, and/or the image processor 150. The focus setting may be referred to as an image capture setting and/or an image processing setting.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference) with a negative (e.g., diverging, concave) lens between them. In some cases, the zoom control mechanism 125C moves one or more of the lenses in the afocal zoom system, such as the negative lens and one or both of the positive lenses.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different color filters, and may thus measure light matching the color of the filter covering the photodiode. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter. Other types of color filters may use yellow, magenta, and/or cyan (also referred to as "emerald") color filters instead of or in addition to red, blue, and/or green color filters. Some image sensors may lack color filters altogether, and may instead use different photodiodes throughout the pixel array (in some cases vertically stacked). The different photodiodes throughout the pixel array can have different spectral sensitivity curves, therefore responding to different wavelengths of light. Monochrome image sensors may also lack color filters and therefore lack color depth.

In some cases, the image sensor 130 may alternately or additionally include opaque and/or reflective masks that block light from reaching certain photodiodes, or portions of certain photodiodes, at certain times and/or from certain angles, which may be used for phase detection autofocus (PDAF). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

The image processor 150 may include one or more processors, such as one or more image signal processors (ISPs) (including ISP 154), one or more host processors (including host processor 152), and/or one or more of any other type of processor 1210 discussed with respect to the computing system 1200. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140 and/or 1220, read-only memory (ROM) 145 and/or 1225, a cache, a memory unit, another storage device, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices 1235, any other input devices 1245, or some combination thereof. In some cases, a caption may be input into the image processing device 105B through a physical keyboard or keypad of the I/O devices 160, or through a virtual keyboard or keypad of a touchscreen of the I/O devices 160. The I/O 160 may include one or more ports, jacks, or other connectors that enable a wired connection between the system 100 and one or more peripheral devices, over which the system 100 may receive data from the one or more peripheral device and/or transmit data to the one or more peripheral devices. The I/O 160 may include one or more wireless transceivers that enable a wireless connection between the system 100 and one or more peripheral devices, over which the system 100 may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O 160. In some cases, certain components illustrated in the image capture device 105A, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 1202.11 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

Figure 2A:
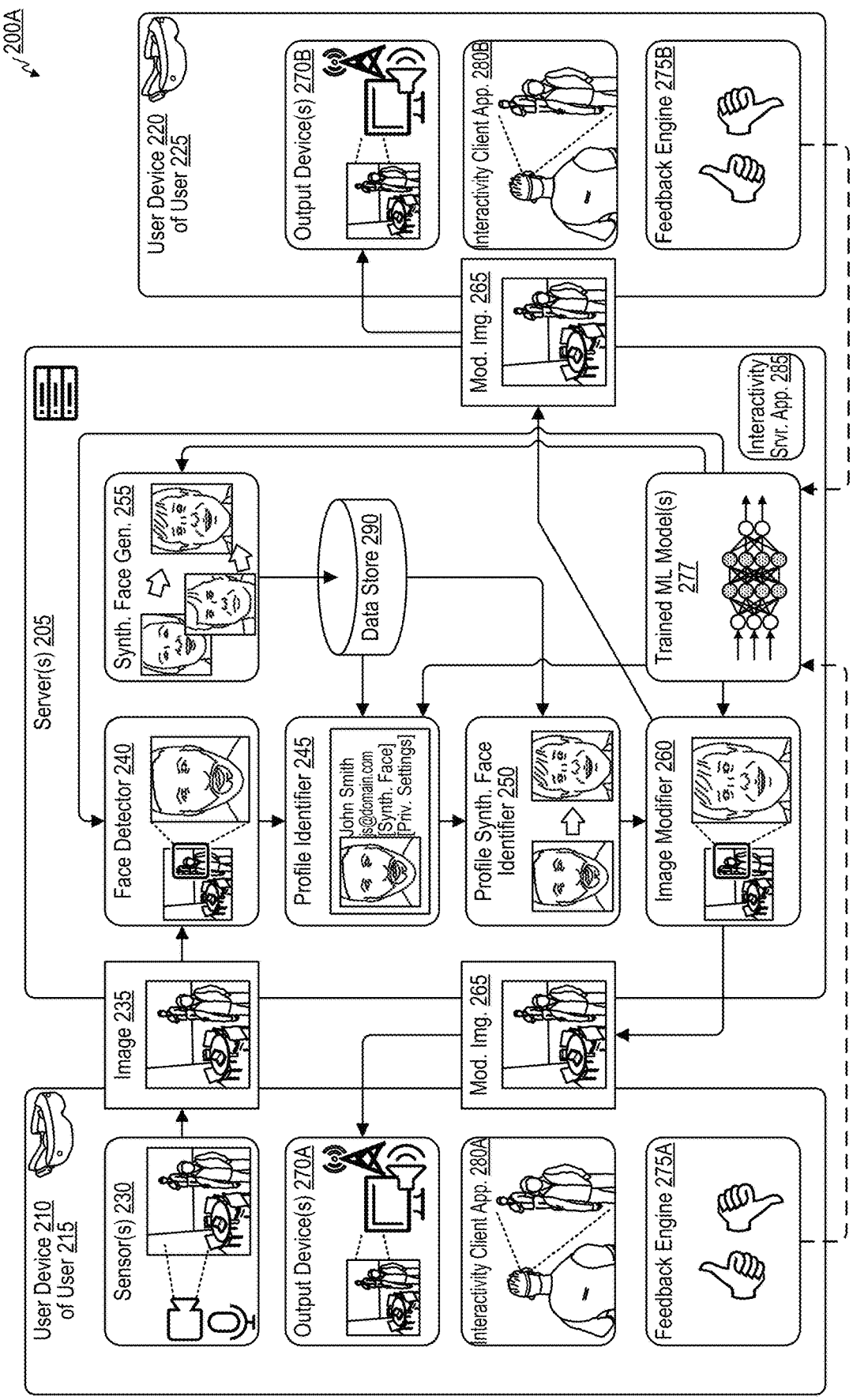
FIG. 2A is a block diagram illustrating an example architecture of imaging process performed by an imaging system with one or more servers and two user devices, in accordance with some examples.

FIG. 2A is a block diagram illustrating an example architecture of imaging process performed by an imaging system 200A with one or more servers 205 and two user devices. In particular, the imaging system 200A includes one or more servers 205, a user device 210 associated with a user 215, and a user device 220 associated with a user 225. Each of the server(s) 205, the user device 210, and/or the user device 220 can include at least one computing system 1200. Each of the server(s) 205, the user device 210, and/or the user device 220 can include, for instance, one or more laptops, phones, tablet computers, mobile handsets, video game consoles, vehicle computers, desktop computers, wearable devices, televisions, media centers, XR systems, head-mounted display (HMD) devices, other types of computing devices discussed herein, or combinations thereof. In some examples, the user device 210 includes component(s) illustrated and/or described herein as included in the user device 220. In some examples, the user device 210 can perform operation(s) illustrated and/or described herein as performed by the user device 220. In some examples, the user device 220 includes component(s) illustrated and/or described herein as included in the user device 210. In some examples, the user device 220 can perform operation(s) illustrated and/or described herein as performed by the user device 210. In some examples, the user device 210 and/or user device 220 include component(s) illustrated and/or described herein as included in the server(s) 205. In some examples, the user device 210 and/or user device 220 can perform operation(s) illustrated and/or described herein as performed by the server(s) 205. In some examples, the server(s) 205 include component(s) illustrated and/or described herein as included in the user device 210 and/or user device 220. In some examples, the server(s) 205 can perform operation(s) illustrated and/or described herein as performed by the user device 210 and/or user device 220.

The imaging system 200A, and the corresponding imaging process, can be used in network-based interactive system applications, such as those for video conferencing, extended reality (XR), video gaming, metaverse environments, or combinations thereof. For instance, the user device 210 includes an interactivity client application 280A, the user device 220 includes an interactivity client application 280B, and the server 205 includes an interactivity server application 285. In some examples, the interactivity client application 280A and the interactivity client application 280B can be client instances of a software application for network-based interactive system applications, such as those for video conferencing, extended reality (XR), video gaming, metaverse environments, or combinations thereof. In some examples, the interactivity server application 285 can be a server instance of a software application for network-based interactive system applications, such as those for video conferencing, extended reality (XR), video gaming, meta-verse environments, or combinations thereof. In some examples, the interactivity client application 280A, the interactivity client application 280B, and/or the interactivity server application 285 can generate virtual environments, virtual elements to incorporate into real-world environments (e.g., as represented in image data captured using the sensor(s) 230), or a combination thereof. In some examples, a representation of the user 215 and/or a representation of user 225 are positioned within, and/or are able to move throughout, an environment that is at least partially virtual, with the virtual elements of the environment generated using the interactivity client application 280A, the interactivity client application 280B, and/or the interactivity server application 285. For instance, the environment that is at least partially virtual can be an environment of a video game, a VR environment, an AR environment, an MR environment, an XR environment, a metaverse environment, video conferencing environment, teleconferencing environment, or a combination thereof. Within FIG. 2A, a graphic representing the interactivity client application 280A and the interactivity client application 280B illustrates a user (e.g., the user 215 or the user 225) wearing an HMD device (e.g., the user device 210 or the user device 220) and seeing representations (e.g., virtual representations) of two people (e.g., the two people depicted in the image 235 and/or the modified image 265) in an XR environment (e.g., which may be at least partially virtual). The XR environment can be at least partially generated using the interactivity client application 280A, the interactivity client application 280B, and/or the interactivity server application 285.

The user device 210 of the user 215 includes one or more sensors 230. In some examples, the sensor(s) 230 include one or more image sensors or one or more cameras. The image sensor(s) capture image data that can include one or more images, one or more videos, portions thereof, or combinations thereof. In some examples, at least one of the sensor(s) 230 can be directed toward the user 215 (e.g., can face toward the user 215), and can thus capture sensor data (e.g., image data) of (e.g., depicting or otherwise representing) at least portion(s) of the user 215. In some examples, at least one of the sensor(s) 230 can be directed away from the user 215 (e.g., can face away from the user 215) and/or toward an environment that the user 215 is in, and can thus capture sensor data (e.g., image data) of (e.g., depicting or otherwise representing) at least portion(s) of the environment. In some examples, sensor data captured by at least one of the sensor(s) 230 that is directed away from the user 215 and/or toward the user 215 can have a field of view (FoV) that includes, is included by, overlaps with, and/or otherwise corresponds to, a FoV of the eyes of the user 215. Within FIG. 2A, a graphic representing the sensor(s) 230 illustrates the sensor(s) 230 as including a camera facing an environment in which two people are located.

In some examples, the sensor(s) 230 capture sensor data measuring and/or tracking information about aspects of the user 215's body and/or behaviors by the user 215. In some examples, the sensors 230 include one or more image sensors of one or more cameras that face at least a portion of the user (e.g., at least a portion of the face and/or head of the user 215). The one or more cameras can include one or more image sensors that capture image data including one or more images of at least a portion of the user 215. For instance, the sensors 230 can include one or more image sensors focused on one or both eyes (and/or eyelids) of the user 215, with the image sensors of the cameras capturing image data of one or both eyes of the user 215. The one or more image sensors may also be referred to as eye capturing sensor(s). In some implementations, the one or more image sensors can capture image data that includes series of images over time, which in some examples may be sequenced together in temporal order, for instance into videos. These series of images can depict or otherwise indicate, for instance, movements of the user 215's eye(s), pupil dilations, blinking (using the eyelids), squinting (using the eyelids), saccades, fixations, eye moisture levels, optokinetic reflexes or responses, vestibulo-ocular reflexes or responses, accommodation reflexes or responses, other attributes related to eyes and/or eyelids described herein, or a combination thereof.

The sensor(s) 230 can include one or more sensors that track information about the user 215 and/or the environment, including pose (e.g., position and/or orientation), body of the user 215, and/or behaviors of the user 215. For instance, the sensor(s) 230 can include one or more cameras, image sensors, microphones, heart rate monitors, oximeters, biometric sensors, positioning receivers, Global Navigation Satellite System (GNSS) receivers, Inertial Measurement Units (IMUs), accelerometers, gyroscopes, gyrometers, barometers, thermometers, altimeters, depth sensors, light detection and ranging (LIDAR) sensors, radio detection and ranging (RADAR) sensors, sound detection and ranging (SODAR) sensors, sound navigation and ranging (SONAR) sensors, time of flight (ToF) sensors, structured light sensors, other sensors discussed herein, or combinations thereof. In some examples, the one or more sensors 230 include at least one image capture and processing system 100, image capture device 105A, image processing device 105B, or combination(s) thereof. In some examples, the one or more sensors 230 include at least one input device 1245 of the computing system 1200. In some implementations, one or more of the sensor(s) 230 may complement or refine sensor readings from other sensor(s) 230. For example, Inertial Measurement Units (IMUs), accelerometers, gyroscopes, or other sensors may be used to identify a pose (e.g., position and/or orientation) of the user device 210 and/or of the user 215 in the environment, and/or the gaze of the user 215 through the user device 210.

The sensor(s) 230 of the user device 210 include image sensor(s) that capture an image 235 of an environment (and/or of the user 215). Within FIG. 2A, a graphic representing the image 235 illustrates the image 235 as depicting an environment with two people in it. The user device 210 sends the image 235 to the server(s) 205.

The server(s) 205 receive the image 235. A face detector 240 of the server(s) 205 detects a face of a person who is depicted in the image 235. The face detector 240 can detect, extract, recognize, and/or track features of the face, body, object(s), and/or portions of the environment in order to detect the face of the person. In some examples, the face detector 240 detects the face of the person by first detecting the body of the person, and then detecting the face based on the expected position of the face within the structure of the body. In some examples, the face detector 240 detects the face of the person by inputting the image 235 into one or more of the one or more trained machine learning (ML) model(s) 277 discussed herein, and receiving an output indicating the face's position and/or orientation. The trained machine learning (ML) model(s) 277 can be trained (e.g., by the user device 210, the user device 220, the server(s) 205, and/or another device) for use by the face detector 240 using training data that includes images that include faces for which positions and/or orientations of the faces are predetermined. In some examples, the face detector 240 detects a position of the face within the image 235 (e.g., pixel coordinates), a position of the face within the environment (e.g., 3D coordinates within the 3D volume of the environment), an orientation (e.g., pitch, yaw, and/or roll) of the face within the image 235 (e.g., along axes about which rotation is visible in the image 235), and/or an orientation (e.g., pitch, yaw, and/or roll) of the face within the environment. For example, the pose (e.g., position and/or orientation) of the face in the environment can be based on how a distance between two features on the face (e.g., an inter-eye distance) in the image 235 compares to a reference distance (e.g., inter-eye distance) for an average human being. In some examples, the face detector 240 detects the face of the person using feature detection, feature extraction, feature recognition, feature tracking, object detection, object recognition, object tracking, facial detection, facial recognition, facial tracking, person detection, person recognition, person tracking, classification, or a combination thereof. In some examples, some of the sensor(s) 230 face the eye(s) of the user 215, and the face detector 240 can detect the face in the image 235 based on gaze detection of the gaze of the eye(s) of the user 215. In some examples, the user device 210 and/or server(s) 205 can receive one or more communications from a user device of the person in the image 235, which the face detector 240 can use as an indicator that there is likely to be a face of that person (or a person more generally) in the image 235. Within FIG. 2A, a graphic representing the face detector 240 illustrates the image 235 with a bounding box around a face of a person depicted in the image 235, with a zoomed-in version of the face of the person illustrated extending from the box. The face appears to be a face of a young man with short hair and a beard.

The server(s) 205 include a profile identifier 245. The profile identifier 245 retrieves a profile of the person whose face was detected by the face detector 240 from a data store 290. If the person does not already have a profile in the data store 290, the profile identifier 245 can create (e.g., generate) a profile for the person. In some cases, the profile identifier 245 and/or the face detector 240 use facial recognition on the face of the person, and/or person recognition on the body of the person, to recognize an identifier for the person (e.g., name, email address, phone number, mailing address, number, code, etc.) before querying the data store 290 for the identifier to retrieve the profile for the person from the data store 290 (or to receive an indicator from the data store 290 that no profile corresponding to the indicator exists yet). In some examples, profile identifier 245 and/or the face detector 240 can use at least one of the trained ML model(s) 277 to perform facial recognition on the face of the person in the image 235 to determine an identifier corresponding to the person (and/or to the person's face) to query the data store 290 for. The trained machine learning (ML) model(s) 277 can be trained (e.g., by the user device 210, the user device 220, the server(s) 205, and/or another device) for use in facial recognition by the face detector 240 and/or the profile identifier 245 using training data that includes images that include faces for which identifiers for the faces are predetermined. In some examples, the user device 210 and/or server(s) 205 can receive one or more communications from a user device of the person in the image 235, and the profile identifier 245 can identify an identifier corresponding to the person (e.g., name, email address, phone number, mailing address, number, code, etc.) based on the one or more communications from the user device of the person. In some examples, facial recognition can include comparison of the face detected in the image by the face detector 240 to a data structure of reference faces stored in the data store 290, with an identifier listed for each of the reference faces in the data store 290. Within FIG. 2A, a graphic representing the profile identifier 245 illustrates a profile with an image of the face of the person detected by the face detector 240 (e.g., the young man with short hair and a beard), a name ("John Smith") for the same person, an email address ("js@domain.com") for the same person, a synthesized face corresponding to the same person, and privacy settings of the same person.

The data store 290 may include one or more data structures, such as one or more databases, tables, lists, arrays, matrices, heaps, ledgers, distributed ledgers (e.g., blockchain ledgers and/or directed acyclic graph (DAG) ledgers), or combinations thereof. The data store 290 may store profiles for persons, such as profiles for users (e.g., user 215, user 225) and/or other persons detected in image(s) (e.g., image 235) captured by sensor(s) (e.g., sensor(s) 230) of user devices (e.g., user device 210, user device 220). A profile for a person may include one or more images of the person (e.g., of the person's real face), one or more identifiers for the person (e.g., name, email address, phone number, mailing address, number, code, etc.), one or more synthesized faces for the person (e.g., generated by the synthesized face generator 255), one or more privacy settings for the person (e.g., privacy settings 835), or a combination thereof. An example of a profile for a person "John Smith" is illustrated in the graphic representing the profile identifier 245 in FIG. 2A.

The server(s) 205 include a profile synthesized face identifier 250 and a synthesized face generator 255. Once the profile identifier 245 identifies a profile for the person whose face is detected in the image 235 by the face detector 240, the profile synthesized face identifier 250 identifies a synthesized face for the person. The synthesized face for the person can be generated by the synthesized face generator 255 and stored in the data store 290. In some examples, the profile might not yet include a synthesized face for the person, for instance if the profile is a new profile, or if a previous synthesized face has been in use for longer than an expiration threshold time duration and is scheduled to be replaced by a new synthesized face. In some examples, the synthesized face generator 255 can generate the synthesized face for the person in real-time as requested by the profile synthesized face identifier 250, the profile identifier 245, the data store 290, the server(s) 205, the user device 210, and/or the user device 220. In some examples, the synthesized face generator 255 can generate the synthesized face for the person ahead of time and store the synthesized face with (or in association with) the profile of the person in the data store 290, and the profile synthesized face identifier 250 can retrieve the synthesized face from the data store 290 after identifying the profile using the profile identifier 245. Within FIG. 2A, a graphic representing the profile synthesized face identifier 250 illustrates an arrow pointing from an image of the face of the person detected by the face detector 240 (e.g., the young man with short hair and a beard named John Smith) to a corresponding image of a synthesized face for the person (e.g., the synthesized face looking like an older man with longer hair and a clean-shaven chin with no beard).

In some examples, the synthesized face generator 255 can use at least one of the trained ML model(s) 277 to generate the synthesized face for the person. In some examples, the trained ML model(s) 277 used by the synthesized face generator 255 can be trained (e.g., by the user device 210, the user device 220, the server(s) 205, and/or another system) to generate realistic synthesized faces using training data that includes numerous input images of human faces (e.g., see FIG. 7 and/or FIG. 9). In some examples, the trained machine learning model(s) can extract features and/or attributes from the various faces in the input images and combine the extracted features and/or attributes in new ways to generate the realistic synthesized faces. The features and/or attributes can include, for example, eye shape, eye color, eyelash length, nose shape, nose width, nose length, nose height, mount shape, mouth size, lip shape, lip size, lip color, arrangement of teeth, color of teeth, fillings, cheek shape, eyebrow shape, eyebrow color, eyebrow length, eyebrow width, hairstyle, hair color, hair thickness, hair type (e.g., straight or curly), baldness, facial hair style, facial hair color, facial hair thickness, skin tone (e.g., skin color), forehead size, face shape, head shape, jaw shape, or a combination thereof. In some examples, a synthesized face generated by the trained machine learning model(s) can look like a real human face, with correct features and proportions, but be unique from any of the human faces in the training data, and not be representative of any real person. In some examples, the trained machine learning model(s) can include one or more generative adversarial networks (GANs) and/or other deep-learning (DL) based generative ML model(s). The trained machine learning (ML) model(s) 277 can be trained (e.g., by the user device 210, the user device 220, the server(s) 205, and/or another device) for use by the synthesized face generator 255 using training data that includes various input images of faces, and synthesized faces that are pre-generated using various features and/or attributes from those input images. Within FIG. 2A, a graphic representing the synthesized face generator 255 illustrates two arrows pointing respectively from two input images of real human faces toward a single image of a synthesized face that combines features and/or attributes from the two input images of real human faces into a new synthesized face that is distinct from either of the real human faces in the input images.

The server(s) 205 include an image modifier 260. The image modifier 260 generates a modified image 265 at least in part by modifying the image 235 to use the synthesized face (e.g., generated by the synthesized face generator 255 and identified by the profile synthesized face identifier 250) for the person in place of the face of the person in the image 235. In some examples, the synthesized face includes a synthesized head, and the image modifier 260 generates the modified image 265 at least in part by modifying the image 235 to use at least a portion of the synthesized head (e.g., generated by the synthesized face generator 255 and identified by the profile synthesized face identifier 250) for the person in place of the head of the person in the image 235. In some examples, to generate the modified image 265, the image modifier 260 superimposes the synthesized face and/or head for the person over the face and/or head of the person in the image 235. In some examples, to generate the modified image 265, the image modifier 260 replaces the face and/or head of the person in the image 235 with the synthesized face and/or head for the person.

In some examples, the image modifier 260 uses at least one of the trained machine learning model(s) 277 to generate the modified image 265. The trained machine learning model(s) 277 can help to ensure that the synthesized face looks realistic on, and blends into, the rest of the body of the person as depicted in the image 235. The trained machine learning (ML) model(s) 277 can be trained (e.g., by the user device 210, the user device 220, the server(s) 205, and/or another device) for use by the image modifier 260 using training data that includes an image of an environment with face(s) in it, an image of a replacement face to replace one of the faces in the image of the environment with, and a pre-modified version of the image of the environment with the replacement face in place of the original face.

In some examples, the image modifier 260 blends the synthesized face realistically into the rest of the person's body and/or into environment in the image 235, for instance to account for lighting in the environment, head pose (e.g. position and/or orientation) of the person's head, facial expression that the person is making in the image 235, skin tone (e.g., skin color) of the person, or a combination thereof. For instance, in some examples, the image modifier 260 can determine environmental illumination on the original face, and can replicate the same environmental illumination on the synthesized face. The environmental illumination can include color of lighting, strength of lighting, direction of lighting (e.g., from the left, from the right, from above, and/or from below), any shadows cast onto the face from other object(s) in the environment, or combinations thereof. This can ensure that immersion is not broken. In some examples, the image modifier 260 can determine a facial expression (e.g., smiling, laughing, frowning, crying, surprised, etc.) of the face of the person detected in the image 235 using the face detector 240, and can modify the synthesized face to apply the same facial expression (e.g., as in the combined face 930 of FIG. 9). In some examples, the image modifier 260 can determine a facial expression (e.g., smiling, laughing, frowning, crying, surprised, etc.) of the face of the person detected in the image 235 using the face detector 240, and can modify the synthesized face to apply the same facial expression, for instance as in the combined face 930 of FIG. 9. This can allow the user 215 of the user device 210 to see the person's mouth moving when the person talks, and/or to see other facial expressions on the person's face, realistically without breaking immersion, all while still maintaining the person's privacy and not revealing his/her identity to the user 215. Within FIG. 2A, a graphic representing the image modifier 260 illustrates the environment depicted in the image 235 and the modified image 265 with a bounding box around the face of the person (as in the graphic representing the face detector 240), with a zoomed-in version of the synthesized face for the person illustrated extending from the box.

In some examples, the server(s) 205 can generate the synthesized face for the person (e.g., using the synthesized face generator 255), and/or can modify the synthesized face for the person (e.g., using the synthesized face generator 255 and/or the image modifier 260) so that the skin tone of the synthesized face corresponds to the skin tone (e.g., skin color) of the person. This ensures that the skin tone of the synthesized face does not clash with the skin tone of other parts of the user's body that may be visible in the image 235 (e.g., hands, arms, legs, neck, feet, etc.) once the synthesized face is incorporated in the modified image 265. This can ensure that immersion is not broken. In some examples, the synthesized face generator 255 and/or the image modifier 260 can alter the skin tone of other parts of the user's body that are visible in the image (e.g., hands, arms, legs, neck, feet, etc.) to match the skin tone of the synthesized face. This can increase privacy further, for instance so that the user does not even know the original skin tone of the person, but can increase the risk of visual artifacts, for instance if the synthesized face generator 255 and/or the image modifier 260 misclassifies an object in the image as being a body part of the person (e.g., causing the imaging system to incorrectly modify the object's color and/or tone), or if the synthesized face generator 255 and/or the image modifier 260 fails to recognize a body part of the person (e.g., causing the imaging system to fail to modify the skin tone of the body part).

The image modifier 260 outputs the modified image 265, for instance by sending the modified image 265 to the user device 210 to be output to the user 215 by output device(s) 270A of the user device 210 and/or by sending the modified image 265 to the user device 220 to be output to the user 225 by output device(s) 270B of the user device 220. Within FIG. 2A, a graphic representing the modified image 265 illustrates the modified image 265 as depicting the same environment with two people in it as in the graphic representing the image 235, but with the face of one of the people changed to the synthesized face.

The user device 210 includes output device(s) 270A. The user device 220 includes output device(s) 270B. The output device(s) 270A-270B can include one or more visual output devices, such as display(s) or connector(s) therefor. The output device(s) 270A-270B can include one or more audio output devices, such as speaker(s), headphone(s), and/or connector(s) therefor. The output device(s) 270A-270B can include one or more of the output device 1235 and/or of the communication interface 1240 of the computing system 1200. The user device 220 causes the display(s) of the output device 270A-270B to display the modified image 265.

In some examples, the output device(s) 270A-270B include one or more transceivers. The transceiver(s) can include wired transmitters, receivers, transceivers, or combinations thereof. The transceiver(s) can include wireless transmitters, receivers, transceivers, or combinations thereof. The transceiver(s) can include one or more of the output device 1235 and/or of the communication interface 1240 of the computing system 1200. In some examples, the user device 210 and/or user device 220 causes the transceiver(s) to send, to a recipient device, the modified image 265. The recipient device can include a display, and the data sent to the recipient device from the transceiver(s) of the output device(s) 270A-270B can cause the display of the recipient device to display the modified image 265.

In some examples, the display(s) of the output device(s) 270A-270B of the imaging system 200A function as optical "see-through" display(s) that allow light from the real-world environment (scene) around the imaging system 200A to traverse (e.g., pass) through the display(s) of the output device(s) 270A-270B to reach one or both eyes of the user. For example, the display(s) of the output device(s) 270A-270B can be at least partially transparent, translucent, light-permissive, light-transmissive, or a combination thereof. In an illustrative example, the display(s) of the output device(s) 270A-270B includes a transparent, translucent, and/or light-transmissive lens and a projector. The display(s) of the output device(s) 270A-270B of can include a projector that projects virtual content (e.g., the synthesized face(s) of the modified image 265) onto the lens. The lens may be, for example, a lens of a pair of glasses, a lens of a goggle, a contact lens, a lens of a head-mounted display (HMD) device, or a combination thereof. Light from the real-world environment passes through the lens and reaches one or both eyes of the user. The projector can project virtual content (e.g., the synthesized face(s) of the modified image 265) onto the lens, causing the virtual content to appear to be overlaid over the user's view of the environment from the perspective of one or both of the user's eyes. In some examples, the projector can project the virtual content onto the onto one or both retinas of one or both eyes of the user rather than onto a lens, which may be referred to as a virtual retinal display (VRD), a retinal scan display (RSD), or a retinal projector (RP) display.

In some examples, the display(s) of the output device(s) 270A-270B of the imaging system 200A are digital "pass-through" display that allow the user of a user device (e.g., user 215 of user device 210 or user 225 of user device 220) of the imaging system 200A to see a view of an environment by displaying the view of the environment on the display(s) of the output device(s) 270A-270B. The view of the environment that is displayed on the digital pass-through display can be a view of the real-world environment around the imaging system 200A, for example based on sensor data (e.g., images, videos, depth images, point clouds, other depth data, or combinations thereof) captured by one or more environment-facing sensors of the sensor(s) 230, in some cases as modified using the image modifier 260 (e.g., the modified image 265). The view of the environment that is displayed on the digital pass-through display can be a virtual environment (e.g., as in VR), which may in some cases include elements that are based on the real-world environment (e.g., boundaries of a room). The view of the environment that is displayed on the digital pass-through display can be an augmented environment (e.g., as in AR) that is based on the real-world environment. The view of the environment that is displayed on the digital pass-through display can be a mixed environment (e.g., as in MR) that is based on the real-world environment. The view of the environment that is displayed on the digital pass-through display can include virtual content (e.g., synthesized face(s) of the modified image 265) overlaid over or otherwise incorporated into the view of the environment.

The trained ML model(s) 277 can include one or more neural network (NNs) (e.g., neural network 1000), one or more convolutional neural networks (CNNs), one or more trained time delay neural networks (TDNNs), one or more deep networks, one or more autoencoders, one or more deep belief nets (DBNs), one or more recurrent neural networks (RNNs), one or more generative adversarial networks (GANs), one or more conditional generative adversarial networks (cGANs), one or more other types of neural networks, one or more trained support vector machines (SVMs), one or more trained random forests (RFs), one or more computer vision systems, one or more deep learning systems, or combinations thereof.

In some examples, the imaging system 200A includes feedback engine(s) 275A-275B of the user devices (e.g., user device 210 and/or user device 220). The feedback engine(s) 275A-275B are illustrated as part of the user device 210 and user device 220, respectively, but may additionally or alternatively be part of the server(s) 205. The feedback engine(s) 275A-275B can detect feedback received from a user interface of the user device 210, the user device 220, and/or the server(s) 205. The feedback may include feedback on the modified image 265 as displayed (e.g., using the display(s) of the output device(s) 270A-270B) according to interactivity client applications 280A-280B and/or interactivity server application 285. The feedback may include feedback on the modified image 265 on its own. The feedback may include feedback on the synthesized face(s) generated by the synthesized face generator 255 and incorporated into the modified image 265, and/or the blending of the synthesized face(s) with the rest of the image in the modified image 265 by the image modifier 260. The feedback may include feedback on face detection by the face detector 240 and/or the face recognition by the face detector 240 and/or the profile identifier 245. The feedback may include feedback about the face detector 240, the profile identifier 245, the profile synthesized face identifier 250, the synthesized face generator 255, the image modifier 260, or a combination thereof. The feedback engine(s) 275A-275B can detect feedback about one engine of the imaging system 200A received from another engine of the imaging system 200A, for instance whether one engine decides to use data from the other engine or not. The feedback received by the feedback engine(s) 275A-275B can be positive feedback or negative feedback. For instance, if the one engine of the imaging system 200A uses data from another engine of the imaging system 200A, or if positive feedback from a user is received through a user interface, the feedback engine(s) 275A-275B can interpret this as positive feedback. If the one engine of the imaging system 200A declines to data from another engine of the imaging system 200A, or if negative feedback from a user is received through a user interface, the feedback engine(s) 275A-275B can interpret this as negative feedback. Positive feedback can also be based on attributes of the sensor data from the sensor(s) 230, such as the user smiling, laughing, nodding, saying a positive statement (e.g., "yes," "confirmed," "okay," "next"), or otherwise positively reacting to the media. Negative feedback can also be based on attributes of the sensor data from the sensor(s) 230, such as the user frowning, crying, shaking their head (e.g., in a "no" motion), saying a negative statement (e.g., "no," "negative," "bad," "not this"), or otherwise negatively reacting to the virtual content.

In some examples, the feedback engine(s) 275A-275B provides the feedback to one or more ML systems (e.g., to the server(s) 205) of the imaging system 200A as training data to update the one or more trained ML model(s) 277 of the imaging system 200A. For instance, the feedback engine(s) 275A-275B can provide the feedback as training data to the ML system(s) and/or the trained ML model(s) 277 to update the training for the face detector 240, the profile identifier 245, the profile synthesized face identifier 250, the synthesized face generator 255, the image modifier 260, or a combination thereof. Positive feedback can be used to strengthen and/or reinforce weights associated with the outputs of the ML system(s) and/or the trained ML model(s) 277. Negative feedback can be used to weaken and/or remove weights associated with the outputs of the ML system(s) and/or the trained ML model(s) 277.

In some examples, certain elements of the imaging system 200A (e.g., the face detector 240, the profile identifier 245, the profile synthesized face identifier 250, the synthesized face generator 255, the image modifier 260, the feedback engine(s) 275A-275B, the trained ML model(s) 277, the interactivity client applications 280A-280B, the interactivity serve application 285, the data store 290, or a combination thereof) include a software element, such as a set of instructions corresponding to a program, that is run on a processor such as the processor 1210 of the computing system 1200, the image processor 150, the host processor 152, the ISP 154, or a combination thereof. In some examples, these elements of the imaging system 200A include one or more hardware elements, such as a specialized processor (e.g., the processor 1210 of the computing system 1200, the image processor 150, the host processor 152, the ISP 154, or a combination thereof). In some examples, these elements of the imaging system 200A can include a combination of one or more software elements and one or more hardware elements.

In some examples, certain elements of the imaging system 200A (e.g., the face detector 240, the profile identifier 245, the profile synthesized face identifier 250, the synthesized face generator 255, the image modifier 260, the feedback engine(s) 275A-275B, the trained ML model(s) 277, the interactivity client applications 280A-280B, the interactivity serve application 285, the data store 290, or a combination thereof), other instances thereof, or portions thereof, are included as part of, and/or run on, different devices than those illustrated in FIG. 2A. For instance, the user device 220 can include its own instance of the sensor(s) 230, even though these are not illustrated in FIG. 2A.

Figure 2B:
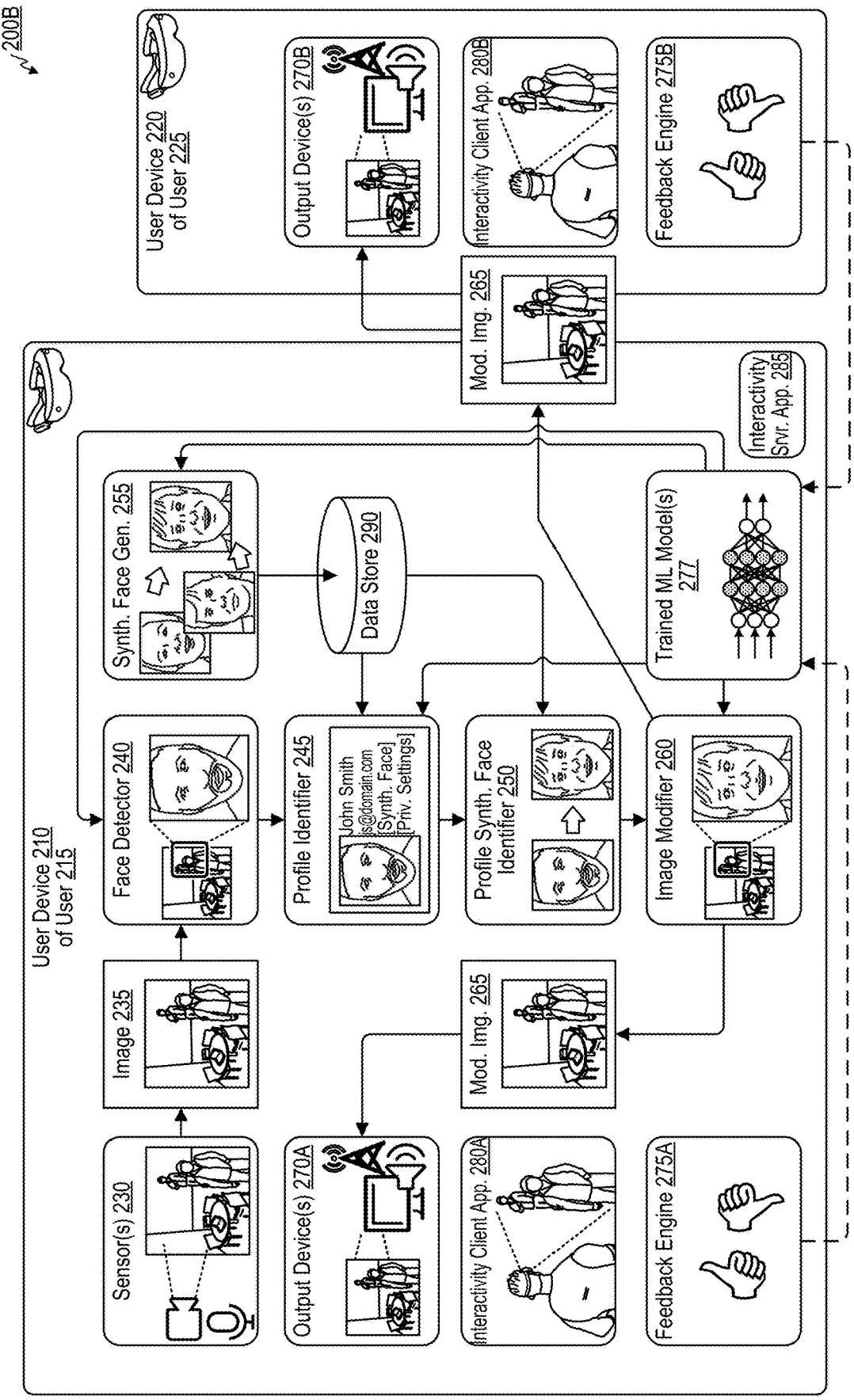
FIG. 2B is a block diagram illustrating an example architecture of imaging process performed by an imaging system with two user devices, in accordance with some examples.

FIG. 2B is a block diagram illustrating an example architecture of imaging process performed by an imaging system 200B with two user devices (e.g., user device 210, user device 220). The imaging system 200B of FIG. 2B is similar to the imaging system 200A of FIG. 2A, but lacks the server(s) 205. Instead, all of the components that are part of the server(s) 205 in the imaging system 200A of FIG. 2A are part of the user device 210 in the imaging system 200B of FIG. 2B. All of the processes and/or operations that are performed by the server(s) 205 in the imaging system 200A of FIG. 2A are performed by the user device 210 in the imaging system 200B of FIG. 2B. In some examples, an imaging system between the imaging system 200A of FIG. 2A and the imaging system 200B of FIG. 2B can be used, where certain components and/or operations are maintained at server(s) 205, while other components and/or operations are maintained at the user device 210.

Figure 3A:
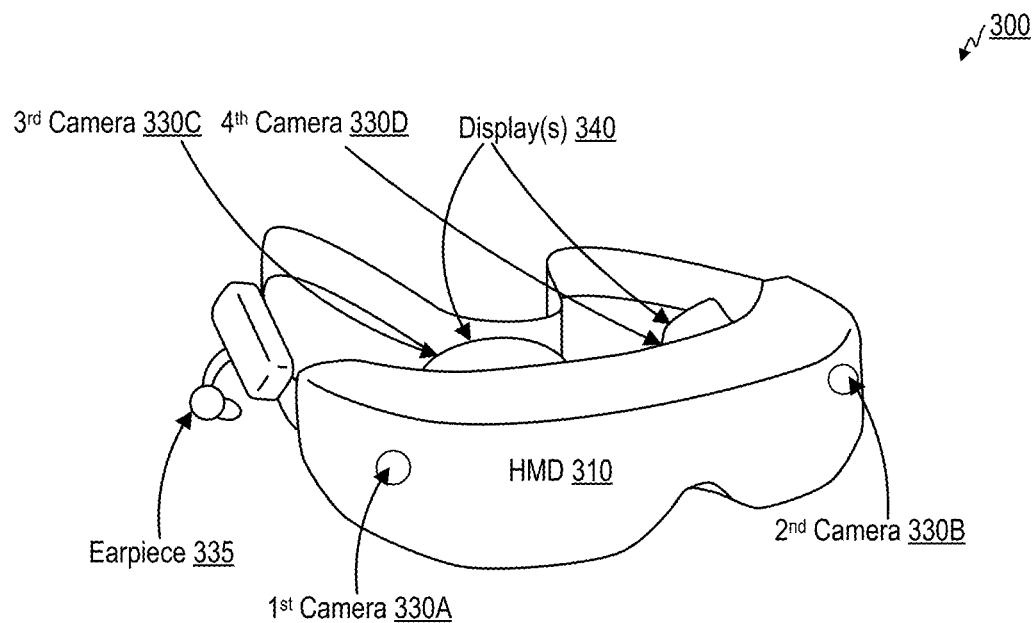
FIG. 3A is a perspective diagram illustrating a head-mounted display (HMD) that is used as part of an imaging system, in accordance with some examples.

FIG. 3A is a perspective diagram 300 illustrating a head-mounted display (HMD) 310 that is used as part of an imaging system 200A or 200B. The HMD 310 may be, for example, an augmented reality (AR) headset, a virtual reality (VR) headset, a mixed reality (MR) headset, an extended reality (XR) headset, or some combination thereof. The HMD 310 may be an example of a user device (e.g., user device 210 and/or user device 220) of an imaging system (e.g., imaging system 200A and/or an imaging system 200B). The HMD 310 includes a first camera 330A and a second camera 330B along a front portion of the HMD 310. The first camera 330A and the second camera 330B may be examples of the sensor(s) 230 of the imaging systems 200A-200B. The HMD 310 includes a third camera 330C and a fourth camera 330D facing the eye(s) of the user as the eye(s) of the user face the display(s) 340. The third camera 330C and the fourth camera 330D may be examples of the sensor(s) 230 of the imaging systems 200A-200B. In some examples, the HMD 310 may only have a single camera with a single image sensor. In some examples, the HMD 310 may include one or more additional cameras in addition to the first camera 330A, the second camera 330B, third camera 330C, and the fourth camera 330D. In some examples, the HMD 310 may include one or more additional sensors in addition to the first camera 330A, the second camera 330B, third camera 330C, and the fourth camera 330D, which may also include other types of sensor(s) 230 of the imaging system 200A. In some examples, the first camera 330A, the second camera 330B, third camera 330C, and/or the fourth camera 330D may be examples of the image capture and processing system 100, the image capture device 105A, the image processing device 105B, or a combination thereof.

The HMD 310 may include one or more displays 340 that are visible to a user 320 wearing the HMD 310 on the user 320's head. The one or more displays 340 of the HMD 310 can be examples of the one or more displays of the output device(s) 270A-270B of the imaging systems 200A-200B. In some examples, the HMD 310 may include one display 340 and two viewfinders. The two viewfinders can include a left viewfinder for the user 320's left eye and a right viewfinder for the user 320's right eye. The left viewfinder can be oriented so that the left eye of the user 320 sees a left side of the display. The right viewfinder can be oriented so that the right eye of the user 320 sees a right side of the display. In some examples, the HMD 310 may include two displays 340, including a left display that displays content to the user 320's left eye and a right display that displays content to a user 320's right eye. The one or more displays 340 of the HMD 310 can be digital "pass-through" displays or optical "see-through" displays.

Figure 3B:
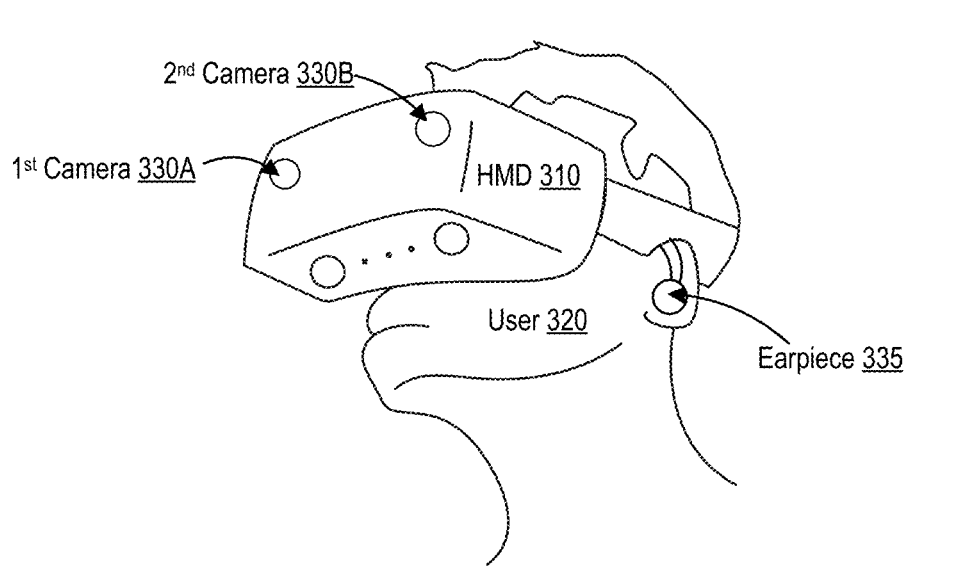
FIG. 3B is a perspective diagram illustrating the head-mounted display (HMD) of FIG. 3A being worn by a user, in accordance with some examples.

The HMD 310 may include one or more earpieces 335, which may function as speakers and/or headphones that output audio to one or more ears of a user of the HMD 310, and may be examples of output device(s) 270A-270B. One earpiece 335 is illustrated in FIGS. 3A and 3B, but it should be understood that the HMD 310 can include two earpieces, with one earpiece for each ear (left ear and right ear) of the user. In some examples, the HMD 310 can also include one or more microphones (not pictured). The one or more microphones can be examples of the sensor(s) 230 of the imaging systems 200A-200B. In some examples, the audio output by the HMD 310 to the user through the one or more earpieces 335 may include, or be based on, audio recorded using the one or more microphones.

FIG. 3B is a perspective diagram 350 illustrating the head-mounted display (HMD) of FIG. 3A being worn by a user 320. The user 320 wears the HMD 310 on the user 320's head over the user 320's eyes. The HMD 310 can capture images with the first camera 330A and the second camera 330B. In some examples, the HMD 310 displays one or more output images toward the user 320's eyes using the display(s) 340. In some examples, the output images can include the modified image 265. The output images can be based on the images captured by the first camera 330A and the second camera 330B (e.g., the image 235), for example with the virtual content (e.g., synthesized face(s) of the modified image 265) overlaid. The output images may provide a stereoscopic view of the environment, in some cases with the virtual content overlaid and/or with other modifications. For example, the HMD 310 can display a first display image to the user 320's right eye, the first display image based on an image captured by the first camera 330A. The HMD 310 can display a second display image to the user 320's left eye, the second display image based on an image captured by the second camera 330B. For instance, the HMD 310 may provide overlaid virtual content in the display images overlaid over the images captured by the first camera 330A and the second camera 330B. The third camera 330C and the fourth camera 330D can capture images of the eyes of the before, during, and/or after the user views the display images displayed by the display(s) 340. This way, the sensor data from the third camera 330C and/or the fourth camera 330D can capture reactions to the virtual content by the user's eyes (and/or other portions of the user). An earpiece 335 of the HMD 310 is illustrated in an ear of the user 320. The HMD 310 may be outputting audio to the user 320 through the earpiece 335 and/or through another earpiece (not pictured) of the HMD 310 that is in the other ear (not pictured) of the user 320.

Figure 4A:
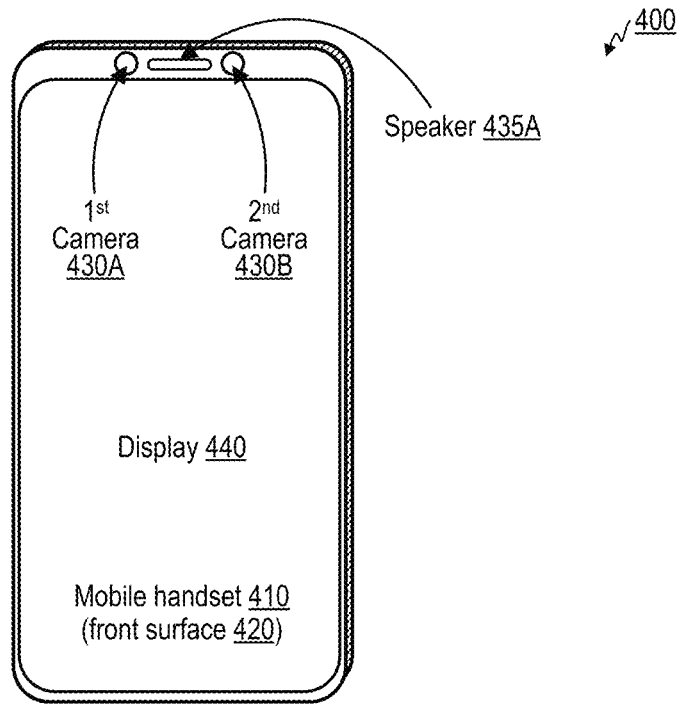
FIG. 4A is a perspective diagram illustrating a front surface of a mobile handset that includes front-facing cameras and that can be used as part of an imaging system, in accordance with some examples.

FIG. 4A is a perspective diagram 400 illustrating a front surface of a mobile handset 410 that includes front-facing cameras and can be used as part of an imaging system 200A or 200B. The mobile handset 410 may be an example of user device (e.g., user device 210 and/or user device 220) of an imaging system (e.g., imaging system 200A and/or imaging system 200B). The mobile handset 410 may be, for example, a cellular telephone, a satellite phone, a portable gaming console, a music player, a health tracking device, a wearable device, a wireless communication device, a laptop, a mobile device, any other type of computing device or computing system discussed herein, or a combination thereof.

The front surface 420 of the mobile handset 410 includes a display 440. The front surface 420 of the mobile handset 410 includes a first camera 430A and a second camera 430B. The first camera 430A and the second camera 430B may be examples of the sensor(s) 230 of the imaging systems 200A-200B. The first camera 430A and the second camera 430B can face the user, including the eye(s) of the user, while content (e.g., the modified image 265 output by the image modifier 260) is displayed on the display 440. The display 440 may be an example of the display(s) of the output device(s) 270A-270B of the imaging systems 200A-200B.

The first camera 430A and the second camera 430B are illustrated in a bezel around the display 440 on the front surface 420 of the mobile handset 410. In some examples, the first camera 430A and the second camera 430B can be positioned in a notch or cutout that is cut out from the display 440 on the front surface 420 of the mobile handset 410. In some examples, the first camera 430A and the second camera 430B can be under-display cameras that are positioned between the display 440 and the rest of the mobile handset 410, so that light passes through a portion of the display 440 before reaching the first camera 430A and the second camera 430B. The first camera 430A and the second camera 430B of the perspective diagram 400 are front-facing cameras. The first camera 430A and the second camera 430B face a direction perpendicular to a planar surface of the front surface 420 of the mobile handset 410. The first camera 430A and the second camera 430B may be two of the one or more cameras of the mobile handset 410. In some examples, the front surface 420 of the mobile handset 410 may only have a single camera.

In some examples, the display 440 of the mobile handset 410 displays one or more output images toward the user using the mobile handset 410. In some examples, the output images can include the modified image 265. The output images can be based on the images (e.g., image 235) captured by the first camera 430A, the second camera 430B, the third camera 430C, and/or the fourth camera 430D, for example with the virtual content (e.g., synthesized face(s) of the modified image 265) overlaid.

In some examples, the front surface 420 of the mobile handset 410 may include one or more additional cameras in addition to the first camera 430A and the second camera 430B. The one or more additional cameras may also be examples of the sensor(s) 230 of the imaging systems 200A-200B. In some examples, the front surface 420 of the mobile handset 410 may include one or more additional sensors in addition to the first camera 430A and the second camera 430B. The one or more additional sensors may also be examples of the sensor(s) 230 of the imaging systems 200A-200B. In some cases, the front surface 420 of the mobile handset 410 includes more than one display 440. The one or more displays 440 of the front surface 420 of the mobile handset 410 can be examples of the display(s) of the output device(s) 270A-270B of the imaging systems 200A-200B. For example, the one or more displays 440 can include one or more touchscreen displays.

The mobile handset 410 may include one or more speakers 435A and/or other audio output devices (e.g., earphones or headphones or connectors thereto), which can output audio to one or more ears of a user of the mobile handset 410. One speaker 435A is illustrated in FIG. 4A, but it should be understood that the mobile handset 410 can include more than one speaker and/or other audio device. In some examples, the mobile handset 410 can also include one or more microphones (not pictured). The one or more microphones can be examples of the sensor(s) 230 of the imaging systems 200A-200B. In some examples, the mobile handset 410 can include one or more microphones along and/or adjacent to the front surface 420 of the mobile handset 410, with these microphones being examples of the sensor(s) 230 of the imaging systems 200A-200B. In some examples, the audio output by the mobile handset 410 to the user through the one or more speakers 435A and/or other audio output devices may include, or be based on, audio recorded using the one or more microphones.

Figure 4B:
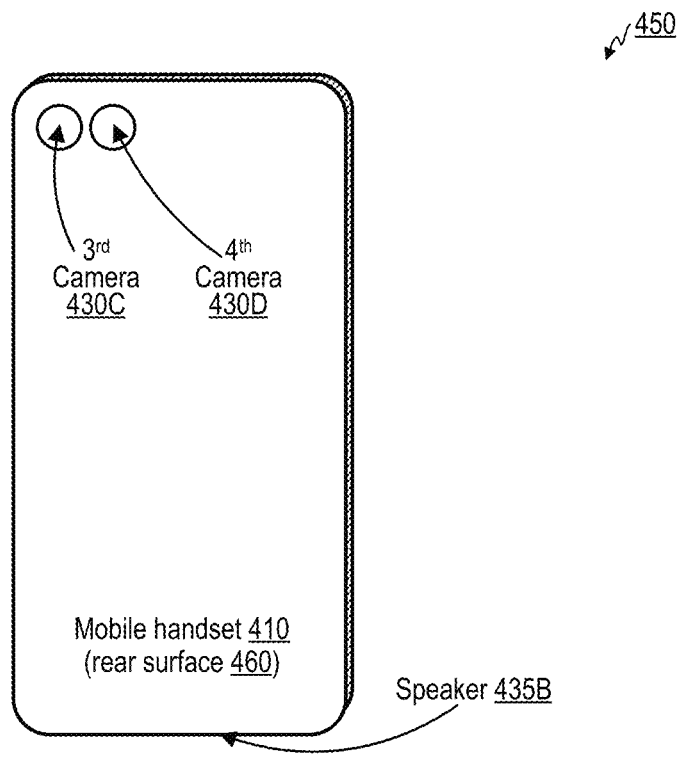
FIG. 4B is a perspective diagram illustrating a rear surface of a mobile handset that includes rear-facing cameras and that can be used as part of an imaging system, in accordance with some examples.

FIG. 4B is a perspective diagram 450 illustrating a rear surface 460 of a mobile handset that includes rear-facing cameras and that can be used as part of an imaging system 200A or 200B. The mobile handset 410 includes a third camera 430C and a fourth camera 430D on the rear surface 460 of the mobile handset 410. The third camera 430C and the fourth camera 430D of the perspective diagram 450 are rear-facing. The third camera 430C and the fourth camera 430D may be examples of the sensor(s) 230 of the imaging systems 200A-200B of FIGS. 2A-2B. The third camera 430C and the fourth camera 430D face a direction perpendicular to a planar surface of the rear surface 460 of the mobile handset 410.

The third camera 430C and the fourth camera 430D may be two of the one or more cameras of the mobile handset 410. In some examples, the rear surface 460 of the mobile handset 410 may only have a single camera. In some examples, the rear surface 460 of the mobile handset 410 may include one or more additional cameras in addition to the third camera 430C and the fourth camera 430D. The one or more additional cameras may also be examples of the sensor(s) 230 of the imaging systems 200A-200B. In some examples, the rear surface 460 of the mobile handset 410 may include one or more additional sensors in addition to the third camera 430C and the fourth camera 430D. The one or more additional sensors may also be examples of the sensor(s) 230 of the imaging systems 200A-200B. In some examples, the first camera 430A, the second camera 430B, third camera 430C, and/or the fourth camera 430D may be examples of the image capture and processing system 100, the image capture device 105A, the image processing device 105B, or a combination thereof.

The mobile handset 410 may include one or more speakers 435B and/or other audio output devices (e.g., earphones or headphones or connectors thereto), which can output audio to one or more ears of a user of the mobile handset 410. One speaker 435B is illustrated in FIG. 4B, but it should be understood that the mobile handset 410 can include more than one speaker and/or other audio device. In some examples, the mobile handset 410 can also include one or more microphones (not pictured). The one or more microphones can be examples of the sensor(s) 230 of the imaging systems 200A-200B. In some examples, the mobile handset 410 can include one or more microphones along and/or adjacent to the rear surface 460 of the mobile handset 410, with these microphones being examples of the sensor(s) 230 of the imaging systems 200A-200B. In some examples, the audio output by the mobile handset 410 to the user through the one or more speakers 435B and/or other audio output devices may include, or be based on, audio recorded using the one or more microphones.

The mobile handset 410 may use the display 440 on the front surface 420 as a pass-through display. For instance, the display 440 may display output images, such as the modified image 265. The output images can be based on the images (e.g. image 235) captured by the third camera 430C and/or the fourth camera 430D, for example with the virtual content (e.g., synthesized face(s) of the modified image 265) overlaid and/or with modifications by the image modifier 260 applied. The first camera 430A and/or the second camera 430B can capture images of the user's eyes (and/or other portions of the user) before, during, and/or after the display of the output images with the virtual content on the display 440. This way, the sensor data from the first camera 430A and/or the second camera 430B can capture reactions to the virtual content by the user's eyes (and/or other portions of the user).

Figure 5:
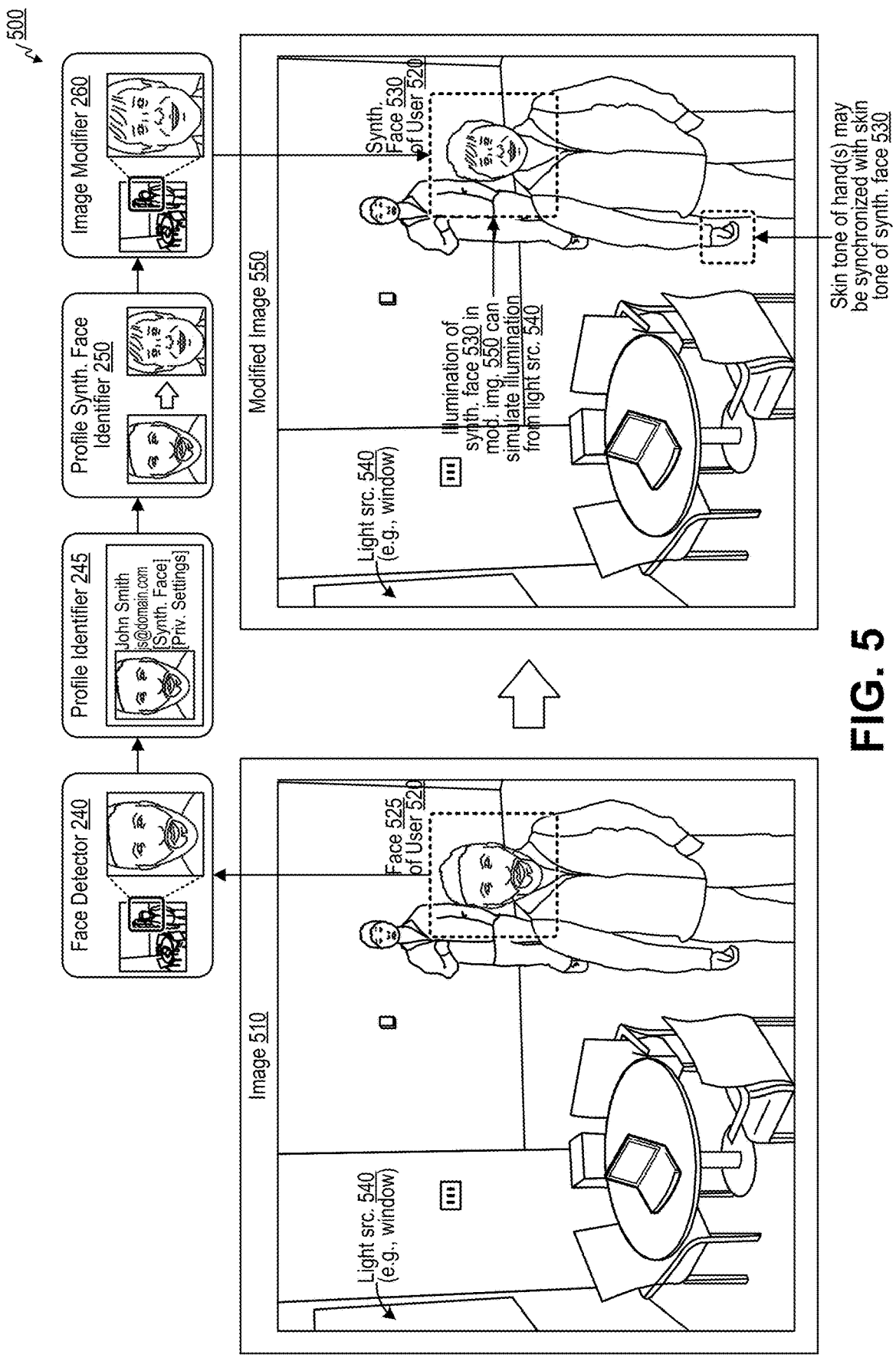
FIG. 5 is a conceptual diagram illustrating generation of a modified image by using a synthesized face of a user in place of the face of the user, in accordance with some examples.

FIG. 5 is a conceptual diagram 500 illustrating generation of a modified image 550 by using a synthesized face 530 of a user 520 in place of the face 525 of the user 520. For instance, an image 510 is illustrated, which may be an example of an image 235 captured by the sensor(s) 230. The face detector 240 detects the face 525 of the user 520 in the image 510. The profile identifier 245 identifies that the face 525 of the user 520 in the image 510 belongs to a user 520 by the name of John Smith, and retrieves the profile for that user 520 (e.g., from the data store 290) or creates the profile (e.g., to store in the data store 290) if the profile does not already exist. The profile synthesized face identifier 250 identifies, based on the profile for the user 520, a synthesized face 530 to use for the user 520. The image modifier 260 generates a modified image 550 by modifying the image 510 to use the synthesized face 530 for the user 520 in place of the face 525 of the user 520.

The image 510 depicts light coming from a light source 540, namely a window. In some examples, light sources may include windows, lamps, the sun, display screens, light bulbs, or combinations thereof. The face 525 of the user 520 is illuminated from the left by the light source 540 in the image 510. Thus, to generate the modified image 550, the image modifier 260 modifies the image 510 to use the synthesized face 530 for the user 520 in place of the face 525 of the user 520, and applies and/or simulates lighting from light source 540 to the synthesized face 530 in the modified image 550. The image modifier 260 can apply and/or simulate lighting from light source 540 to the synthesized face 530 by applying and/or simulating lighting from the same direction as the light source 540 (e.g., from the left of the synthesized face 530, similar to the light being from the left of the face 525), of a similar light color as the light from the light source 540 as illustrated in the image 510, using a similar light pattern as the light from the light source 540 as illustrated in the image 510, or a combination thereof.

The image 510 and the modified image 550 both depict exposed hands of the user 520 in addition to the exposed face (e.g., face 525 or synthesized face 530) of the user 520. The synthesized face generator 255 and/or image modifier 260 can synchronize a skin tone (e.g., skin color) between the face 525, the synthesized face 530, and/or other portions of the user 520's body that are visible in the image 510 and/or the modified image 550 (e.g., as in the hands of the user 520). For instance, in some examples, the imaging system can generate the synthesized face 530, or modify the synthesized face 530 after the synthesized face 530 is generated, so that the skin tone of the synthesized face corresponds to (e.g., matches) the skin tone of the face 525 and/or other portions of the user 520's body that are visible in the image 510 (e.g., as in the hands of the user 520). In some examples, the imaging system can alter the skin tone of other parts of the user's body that are visible in the image (e.g., the hands of the user 520) to match the skin tone of the synthesized face.

Figure 6A:
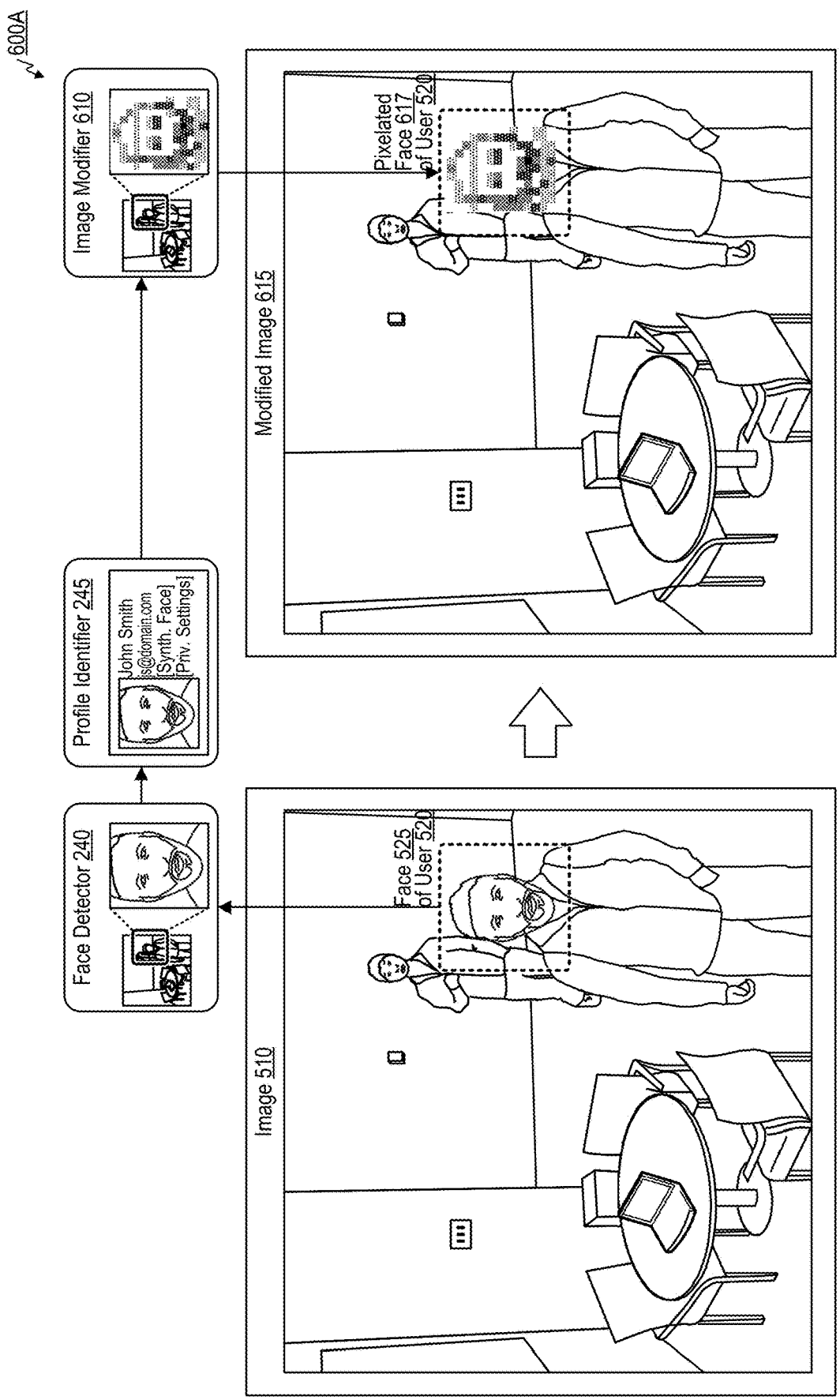
FIG. 6A is a conceptual diagram illustrating generation of a modified image by using a pixelated face of a user in place of the face of the user, in accordance with some examples.

FIG. 6A is a conceptual diagram 600A illustrating generation of a modified image 615 by using a pixelated face 617 of a user in place of the face 525 of the user 520. The conceptual diagram 600A of FIG. 6A includes the image 510 of FIG. 5. The face detector 240 detects the face 525 of the user 520 in the image 510. The profile identifier 245 identifies that the face 525 in the image 510 belongs to the user 520, and identifies (e.g., retrieves or creates) the profile of the user 520. An image modifier 610 of the imaging system (e.g., of the server(s) 205 and/or of the user device 210) generates the modified image 615 by modifying the image 510 to use the pixelated face 617 for the user 520 in place of the face 525 of the user 520. For instance, the image modifier 610 can pixelate the face 525 to generate the pixelated face 617. In some cases, a blurred face (e.g., a blurred instance of the face 525 of the user 520) can be generated and/or used by the image modifier 610 in place of the pixelated face 617.

While use of the pixelated face 617 (or a blurred face) in the modified image 615 as in FIG. 6A protects the privacy of the user 520, this privacy protection is not as secure as use of a synthesized face 530 as in FIG. 5. Image processing techniques for de-pixelating, de-blurring, and/or sharpening images can reproduce the face 525 (or a close approximation) from the pixelated face 617 (or a blurred face) in the modified image 615, providing a security vulnerability in this privacy protection and potentially allowing a malicious party to discover the identity of the user 520 from the modified image 615. Security issues with use of the pixelated face 617 (or a blurred face) can be compounded in videos, since a larger number of pixelated or blurred faces from different video frames can be layered to reconstruct more detailed information about different facial features of the face 525 of the user 520. Furthermore, the use of the pixelated face 617 (or a blurred face) in the modified image 615 as in FIG. 6A breaks immersion in the environment for network-based interactive systems, since pixelated and/or blurred faces (e.g. the pixelated face 617) do not appear in natural environments and therefore appear unnatural and unrealistic, in turn making the modified image 615 as a whole look unnatural and unrealistic.

Figure 6B:
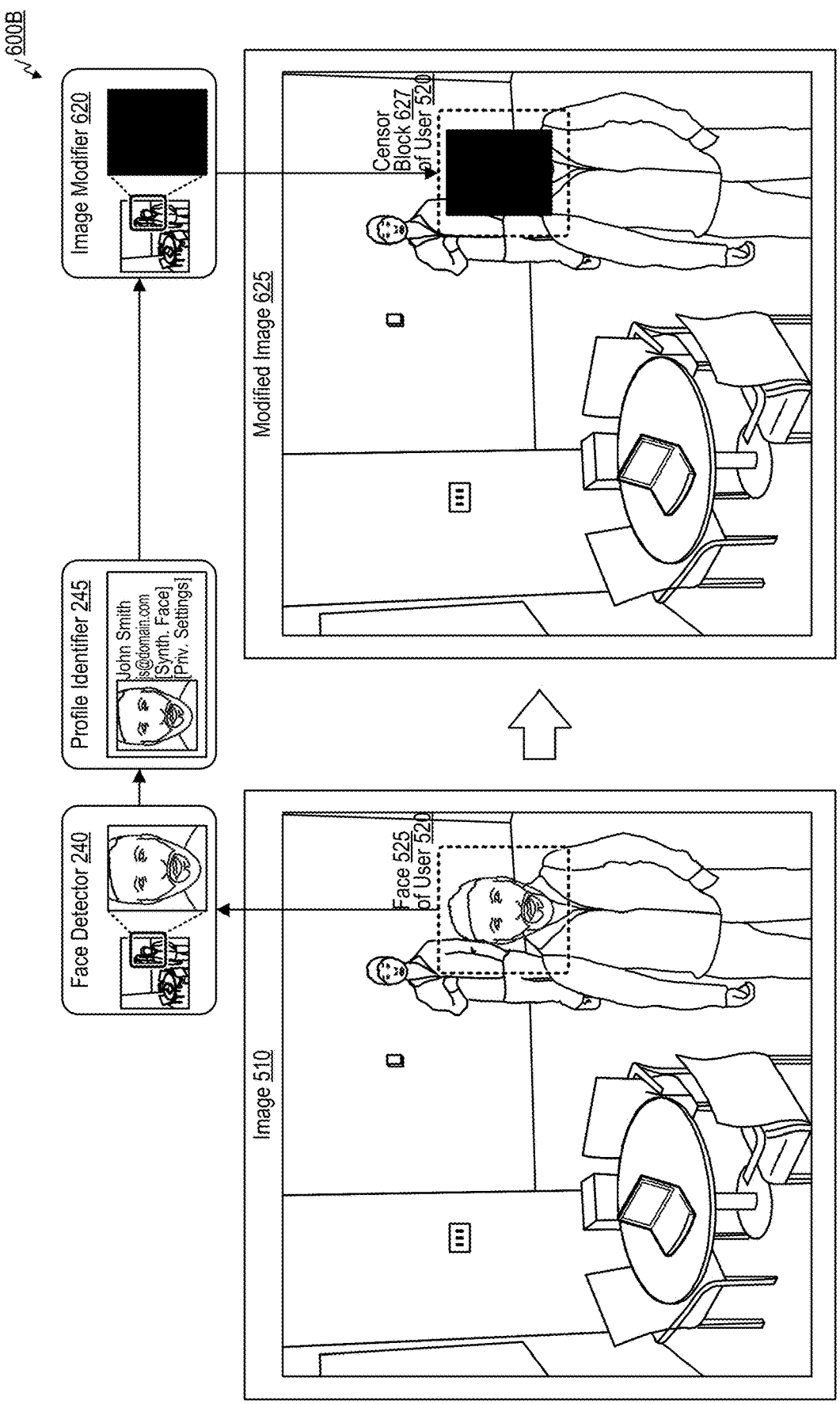
FIG. 6B is a conceptual diagram illustrating generation of a modified image by using a censor block in place of the face of the user, in accordance with some examples.

FIG. 6B is a conceptual diagram 600B illustrating generation of a modified image 625 by using a censor block 627 in place of the face 525 of the user 520. The conceptual diagram 600B of FIG. 6B includes the image 510 of FIG. 5. The face detector 240 detects the face 525 of the user 520 in the image 510. The profile identifier 245 identifies that the face 525 in the image 510 belongs to the user 520, and identifies (e.g., retrieves or creates) the profile of the user 520. An image modifier 620 of the imaging system (e.g., of the server(s) 205 and/or of the user device 210) generates the modified image 625 by modifying the image 510 to use a censor block 627 in place of the face 525 of the user 520. The censor block 627 is illustrated as a black rectangular box, but can be of any shape, any color, and/or any pattern. In some examples, the censor block 627 may include an image. For instance, the image modifier 620 can overlay the censor block 627 over the face 525 of the user 520 to generate the modified image 625.

While use of the censor block 627 in the modified image 625 as in FIG. 6B protects the privacy of the user 520, use of the censor block 627 in the modified image 625 as in FIG. 6B breaks immersion in the environment for network-based interactive systems, since censor blocks (e.g., censor block 627) do not appear in natural environments and therefore appear unnatural and unrealistic, in turn making the modified image 625 as a whole look unnatural and unrealistic.

Figure 6C:
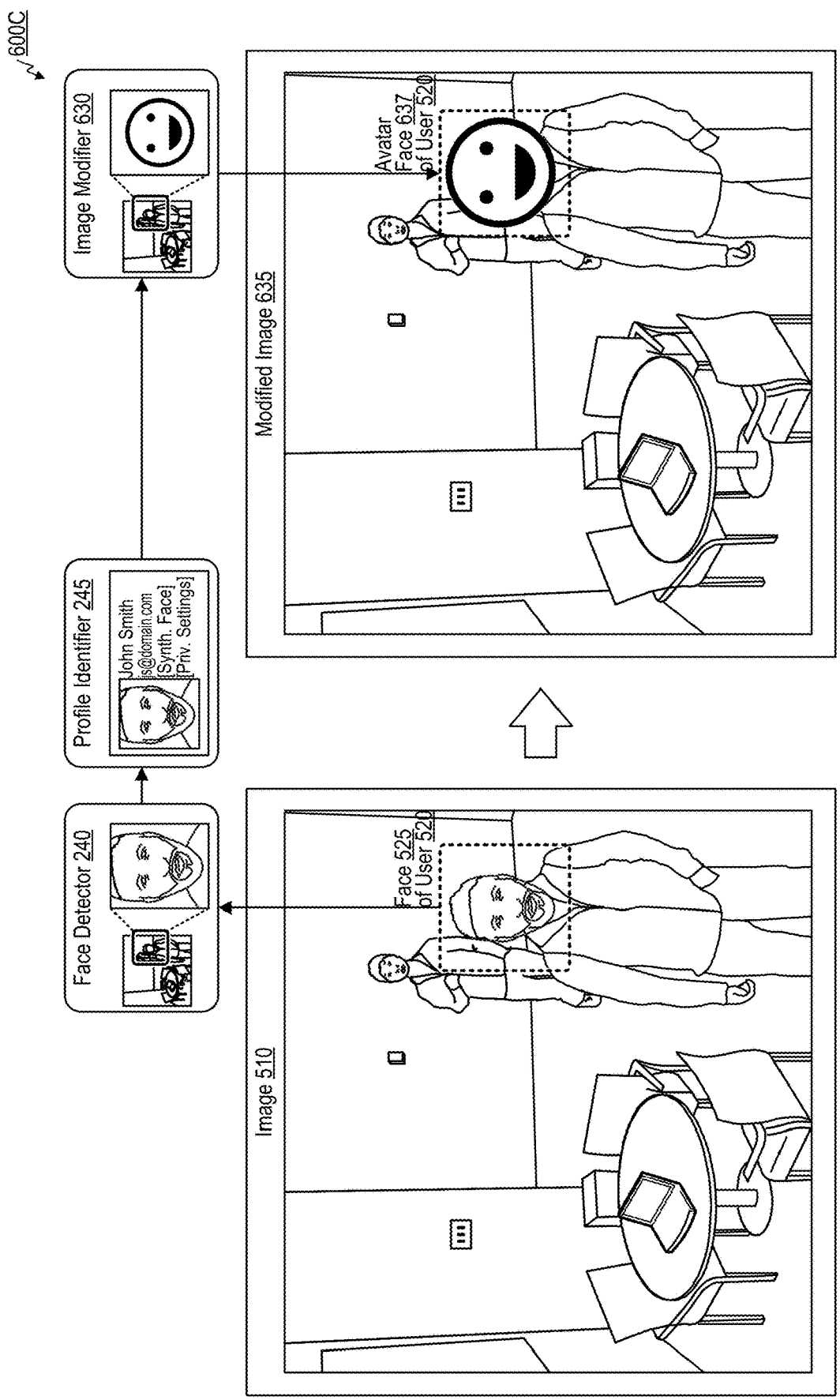
FIG. 6C is a conceptual diagram illustrating generation of a modified image by using an avatar face for a user in place of the face of the user, in accordance with some examples.

FIG. 6C is a conceptual diagram 600C illustrating generation of a modified image 635 by using an avatar face 637 for a user in place of the face 525 of the user 520. The conceptual diagram 600C of FIG. 6C includes the image 510 of FIG. 5. The face detector 240 detects the face 525 of the user 520 in the image 510. The profile identifier 245 identifies that the face 525 in the image 510 belongs to the user 520, and identifies (e.g., retrieves or creates) the profile of the user 520. An image modifier 630 of the imaging system (e.g., of the server(s) 205 and/or of the user device 210) generates the modified image 635 by modifying the image 510 to use an avatar face 637 in place of the face 525 of the user 520. The avatar face 637 is illustrated as a smiley face, but can be another type of cartoonish, unrealistic, or stylized face. In some examples, the avatar face 637 may include an image. For instance, the image modifier 630 can overlay the avatar face 637 over the face 525 of the user 520 to generate the modified image 635.

While use of the avatar face 637 in the modified image 635 as in FIG. 6C protects the privacy of the user 520, use of the avatar face 637 in the modified image 635 as in FIG. 6C breaks immersion in the environment for network-based interactive systems, since avatar faces (e.g., avatar face 637) do not appear in natural environments and therefore appear unnatural and unrealistic, in turn making the modified image 635 as a whole look unnatural and unrealistic.

Figure 6D:
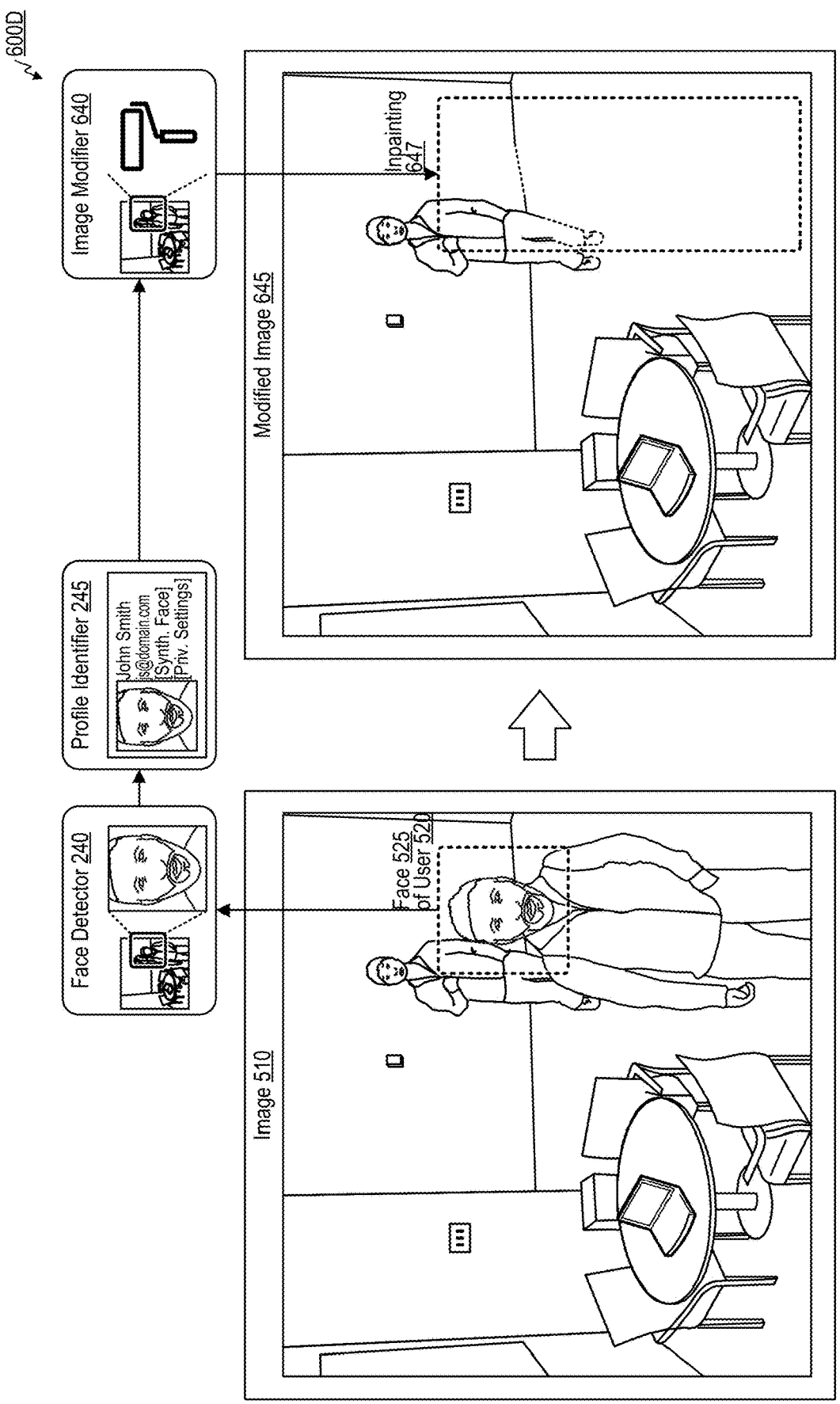
FIG. 6D is a conceptual diagram illustrating generation of a modified image by using inpainting in place of the user, in accordance with some examples.

FIG. 6D is a conceptual diagram 600D illustrating generation of a modified image by using inpainting 647 in place of the user 520. The conceptual diagram 600D of FIG. 6D includes the image 510 of FIG. 5. The face detector 240 detects the face 525 of the user 520 in the image 510. The profile identifier 245 identifies that the face 525 in the image 510 belongs to the user 520, and identifies (e.g., retrieves or creates) the profile of the user 520. An image modifier 640 of the imaging system (e.g., of the server(s) 205 and/or of the user device 210) generates the modified image 645 by modifying the image 510 to use inpainting 647 to replace the area of the image 510 depicting the user 520 (or a portion thereof, such as the face 525) with content that the inpainting 647 infers is behind the user 520 (e.g., background) based on background areas around the area depicting the user 520. For instance, the image modifier 640 can perform inpainting 647 using pixel interpolation, and, in some examples, trained ML model(s) (e.g., the trained ML model(s) 277). In the modified image 645, inpainted lines are drawn as dashed lines.

Inpainting 647 can, in some cases, produce distracting visual artifacts. For example, the line connecting the wall and the floor behind the user 520 appears to curve in an unnatural way in the area where the inpainting 647 is performed. Further, while the inpainting 647 "completes" the body of the other person who was partly behind the user 520 in the image 510 by adding a second leg to the other person, the orientation of the foot in added the second leg exactly matches the orientation of the other foot of the person, making the body pose of the other person look unnatural. Thus, while use of inpainting 647 in the modified image 645 as in FIG. 6D protects the privacy of the user 520, use of the inpainting 647 in the modified image 645 as in FIG. 6D breaks immersion in the environment for network-based interactive systems, since visual artifacts produced by inpainting (e.g., inpainting 647) do not appear in natural environments and therefore appear unnatural and unrealistic, in turn making the modified image 645 as a whole look unnatural and unrealistic. Visual artifacts resulting from inpainting 647 can be compounded in videos, as slightly different visual artifacts may appear in different video frames, sometimes producing a "ghost" of the user 520 in the modified image 645 in the position where the user 520 is in the image 510.

Figure 7:
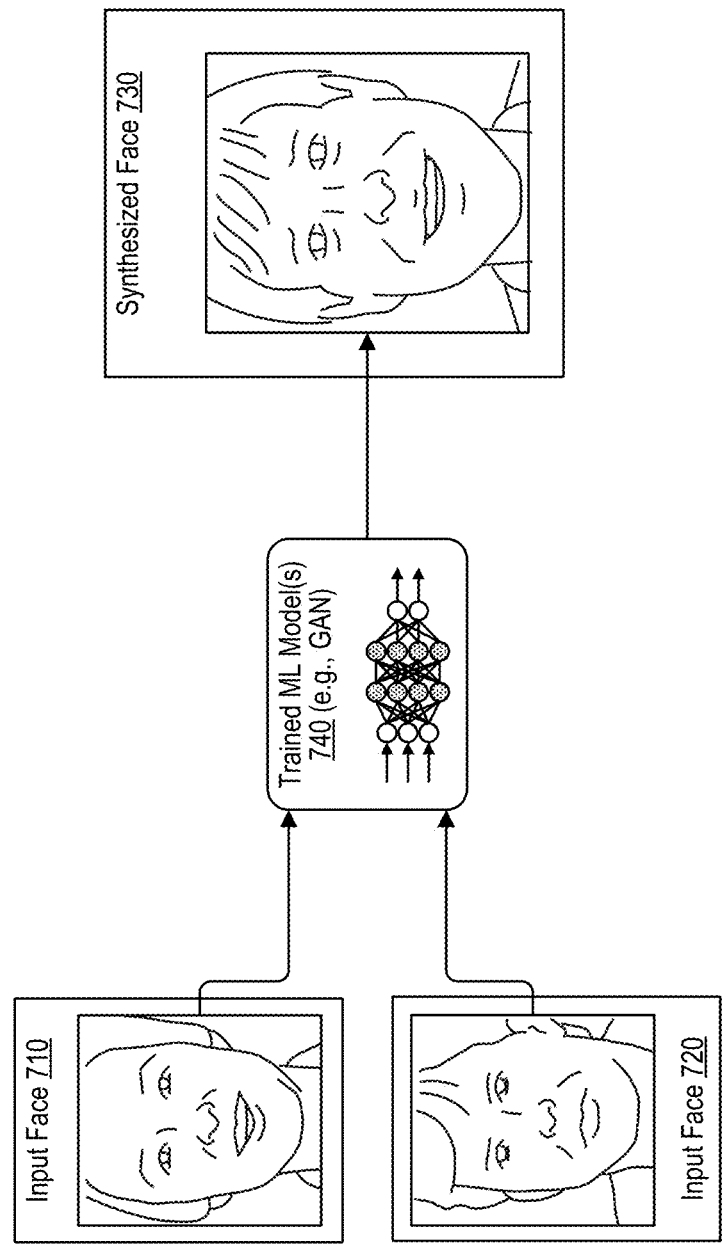
FIG. 7 is a conceptual diagram illustrating generation of a synthesized face based on features of multiple input faces, in accordance with some examples.

FIG. 7 is a conceptual diagram 700 illustrating generation of a synthesized face 730 based on features of multiple input faces. In particular, the synthesized face 730 is generated using the trained ML model(s) 740 based on use of the input face 710 and an input face 720 as inputs into the trained ML model(s) 740 and/or as training data for training the trained ML model(s) 740. The trained ML model(s) 740 can be examples of one or more of the trained ML model(s) 277 that are used by the synthesized face generator 255. The trained ML model(s) 740 can be part of the synthesized face generator 255.

Various facial features and/or facial attributes of the input face 710 and the input face 720 appear in the synthesized face 730, but the synthesized face 730 is visually distinct in identity from both the input face 710 and the input face 720. For instance, the facial expression, face shape, nose, and mouth of the synthesized face 730 are similar to those of the input face 710. However, the eyes, eyebrows, hairstyle, and jaw shape of the synthesized face 730 are similar to those of the input face 710. In some examples, the trained ML model(s) 740 can be trained (e.g., by the user device 210, the user device 220, the server(s) 205, and/or another system) to generate realistic synthesized faces using training data that includes input images of human faces and pre-generated synthesized faces using features from the input images. In some examples, the trained machine learning model(s) 740 can include one or more generative adversarial networks (GANs) and/or other deep-learning (DL) based generative ML model(s).

Figure 8A:
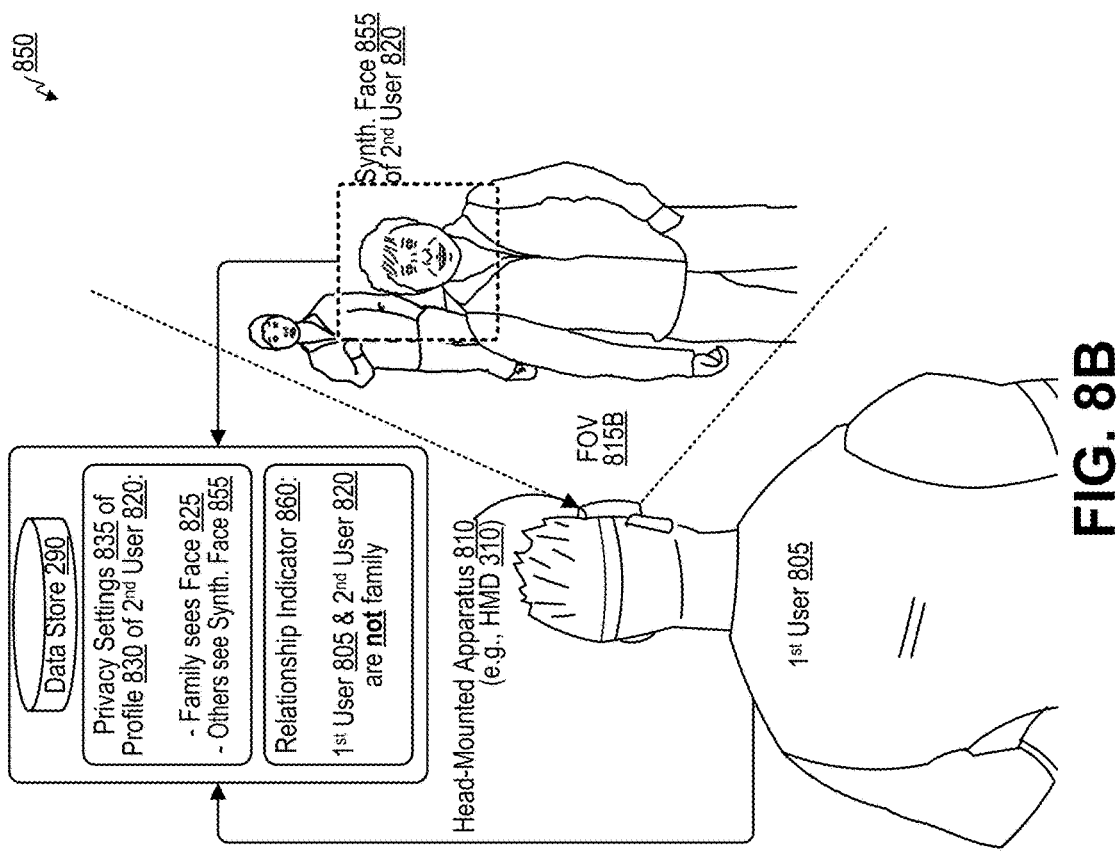
FIG. 8A is a conceptual diagram illustrating a first user using a head-mounted apparatus to view an interactive environment that includes a second user whose face is displayed to the first user through the head-mounted apparatus based on privacy settings of the second user and a relationship indicator indicating a familial relationship between the first user and the second user, in accordance with some examples.

FIG. 8A is a conceptual diagram 800 illustrating a first user 805 using a head-mounted apparatus 810 to view an interactive environment that includes a second user 820 whose face is displayed to the first user 805 through the head-mounted apparatus 810 based on privacy settings 835 of the second user 805 and a relationship indicator 840 indicating a familial relationship between the first user 805 and the second user 820. The head-mounted apparatus 810 is an example of the HMD 310. The head-mounted apparatus 810 displays, to the first user 805, a field of view (FOV) 815A that includes the face 825 of the user 820. The data store 290 stores the privacy settings 835 of the second user 820 in the profile 830 of the second user 820. The profile 830 is an example of a profile identified using the profile identifier 245. The privacy settings 835 of the second user 820 include an approved list, indicating that family members of the second user 820 are permitted to view the face 825 of the user 820. The data store 290 also stores a relationship indicator 840 indicating that the first user 805 and the second user 820 are indeed family. Thus, the first user 805 is on the approved list of the second user 820. Thus, the face 825 of the user 820 is shown, un-disguised, to the user 805 in the FOV 815A via the head-mounted apparatus 810.

Figure 8B:
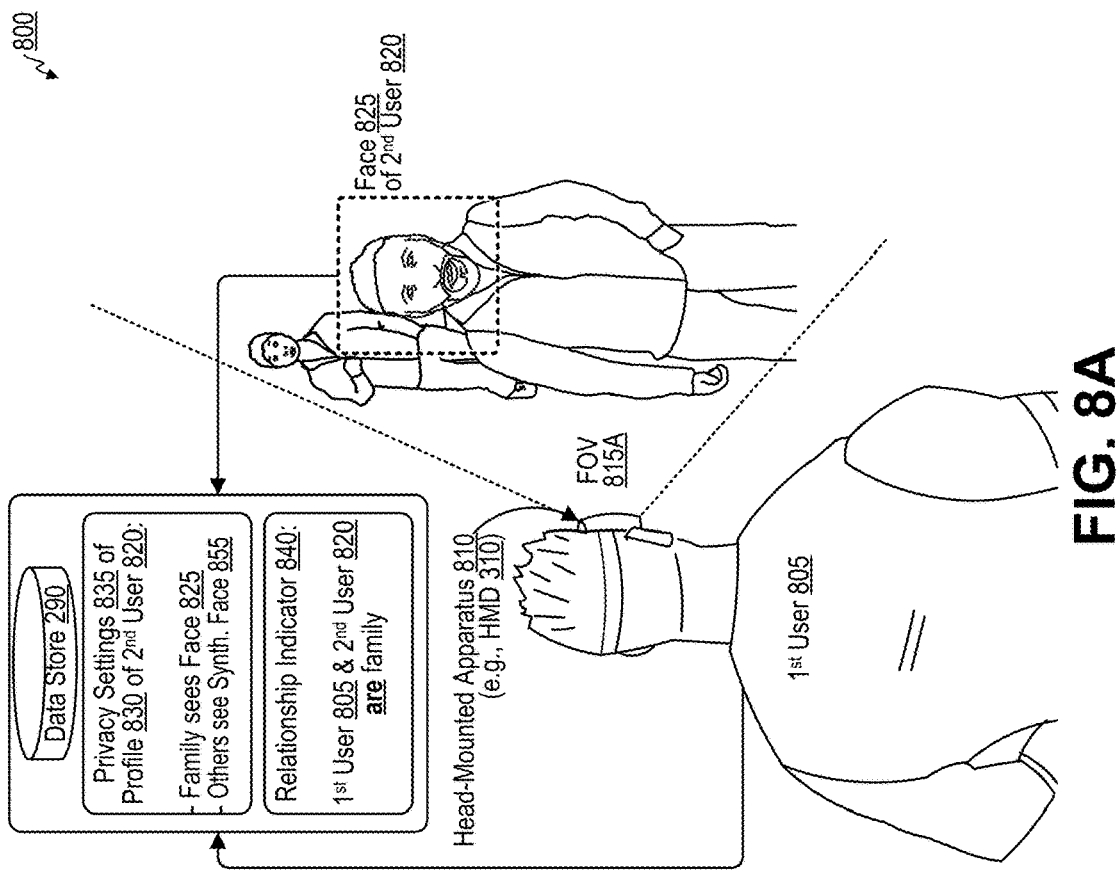
FIG. 8B is a conceptual diagram illustrating the first user using the head-mounted apparatus to view the interactive environment that includes the second user whose synthesized face is displayed to the first user through the head-mounted apparatus based on privacy settings of the second user and a relationship indicator indicating lack of a familial relationship between the first user and the second user, in accordance with some examples.

FIG. 8B is a conceptual diagram 850 illustrating the first user 805 using the head-mounted apparatus 810 to view the interactive environment that includes the second user 820 whose synthesized face 855 is displayed to the first user 805 through the head-mounted apparatus 810 based on privacy settings 835 of the second user 820 and a relationship indicator 860 indicating lack of a familial relationship between the first user 805 and the second user 820. The head-mounted apparatus 810 displays, to the first user 805, a field of view (FOV) 815B that includes the user 820 with the synthesized face 855 of the user 820. In FIG. 8B, the data store 290 stores a relationship indicator 860 that is different from the relationship indicator 840 of FIG. 8A. The relationship indicator 860 indicates that the first user 805 and the second user 820 are not family. Thus, the first user 805 is not on the approved list of the second user 820. Thus, the face 825 of the user 820 is not shown to the user 805 in the FOV 815B via the head-mounted apparatus 810. Instead, the FOV 815B is modified (e.g., using image modifier 260) to use the synthesized face 855 in place of the face 825 of the user 820.

As illustrated in FIGS. 8A-8B, in some examples, whether a person (e.g., the second user 820) has their identity disguised (e.g., by using a synthesized face 855 in place of the person's face) or not disguised (e.g., by leaving the person's face unmodified) can depend on an identity of the viewer (e.g., the first user 805), for instance whether or not the viewer (e.g., the first user 805) is approved by the person (e.g., the second user 820) via privacy settings (e.g., privacy settings 835) of the person.

Figure 9:
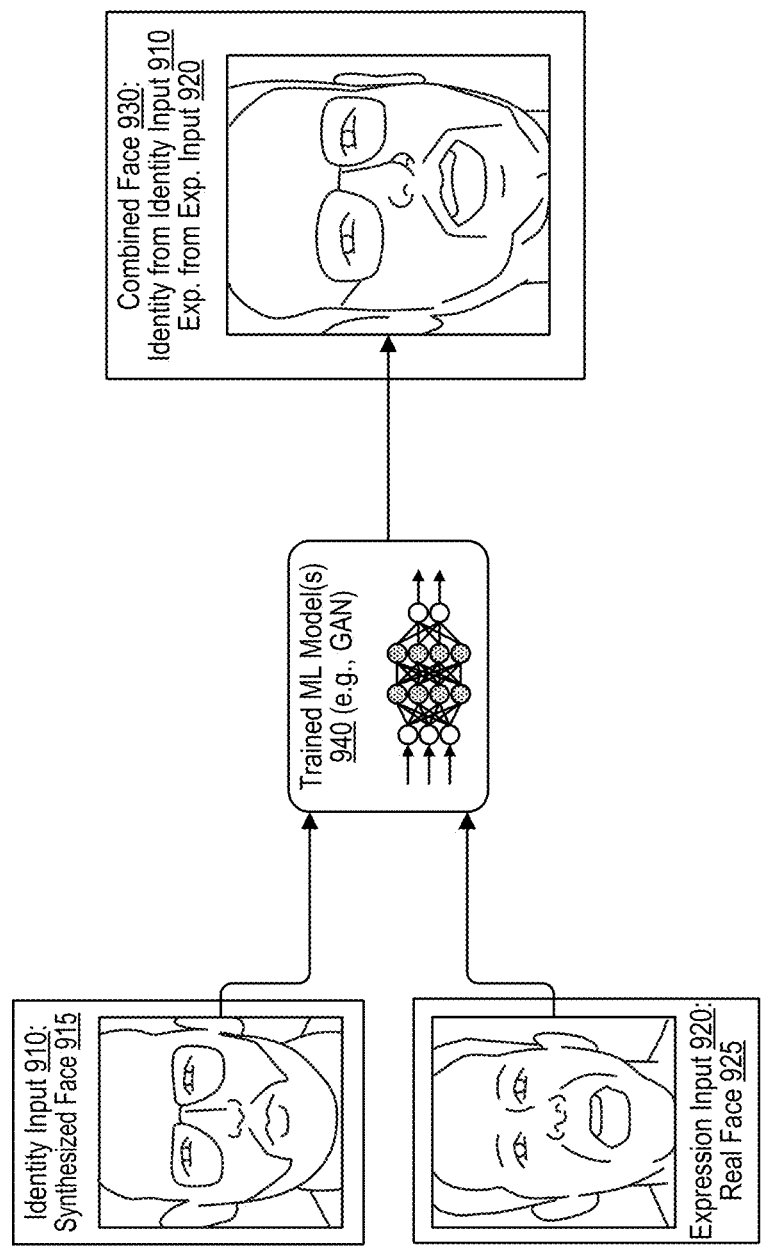
FIG. 9 is a conceptual diagram illustrating combining an identity input and an expression input to generate a combined face with an identity of the identity input and an expression of the expression input, in accordance with some examples.

FIG. 9 is a conceptual diagram 900 illustrating combining an identity input 910 and an expression input 920 to generate a combined face 930 with an identity of the identity input 910 and an expression of the expression input 920. In particular, the combined face 930 is generated using the trained ML model(s) 940 based on use of the identity input 910 and an expression input 920 as inputs into the trained ML model(s) 940 and/or as training data for training the trained ML model(s) 940. The trained ML model(s) 940 can be examples of one or more of the trained ML model(s) 277 that are used by the synthesized face generator 255 and/or the image modifier 260. The trained ML model(s) 940 can be part of the synthesized face generator 255 and/or the image modifier 260.

Various facial features and/or facial attributes representing the identity of the identity input 910 appear in the combined face 930. For instance, the identity input 910 has the identity of a beaded man with glasses, and so does the combined face 930. Various facial features and/or facial attributes representing the expression of the expression input 920 appear in the combined face 930. For instance, the expression input 920 has a shouting expression with an open mouth, and so does the combined face 930. In some examples, the trained ML model(s) 940 can be trained (e.g., by the user device 210, the user device 220, the server(s) 205, and/or another system) to generate realistic combined faces using training data that includes identity input images (e.g., identity input 910) and expression input images (e.g., expression input 920) of human faces and pre-generated combined faces (e.g., combine face 930) using features from the input images. In some examples, the trained machine learning model(s) 940 can include one or more generative adversarial networks (GANs) and/or other deep-learning (DL) based generative ML model(s). In some examples, the identity input is an example of a synthesized face 915, such as a synthesized face 915 generated by a synthesized face generator 255. In some examples, the expression input is an example of a real face 925, such as a face detected by a face detector 240. Use of a combined face 930 with an identity of the identity input 910 (synthesized face 915) and an expression of the expression input 920 (real face 925) can allow the user 215 of the user device 210 to see the person's mouth moving when the person talks, and/or to see other facial expressions on the person's face, realistically without breaking immersion, all while still maintaining the person's privacy and not revealing his/her identity to the user 215.

Figure 10:
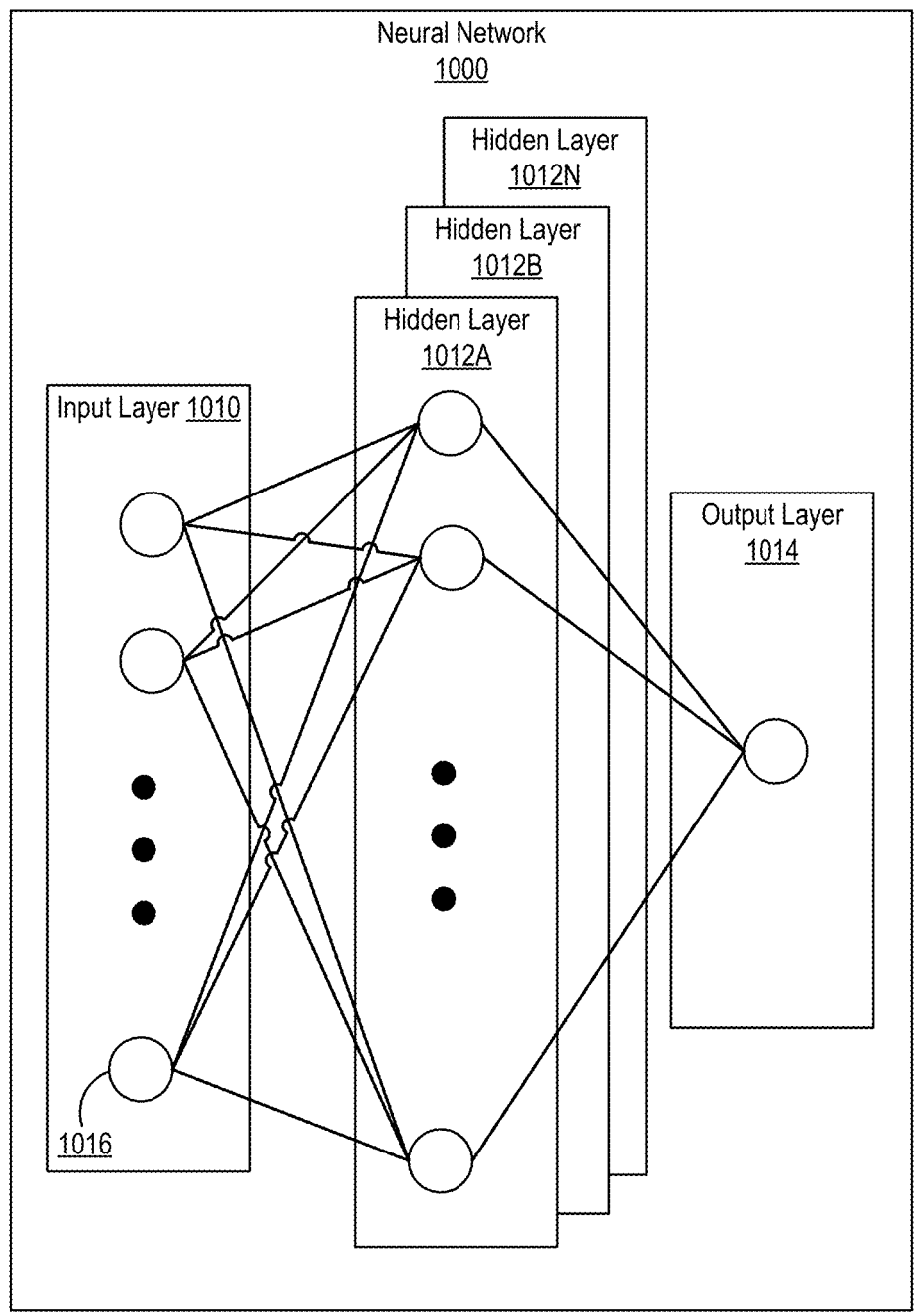
FIG. 10 is a block diagram illustrating an example of a neural network that can be used for image processing operations, in accordance with some examples.

FIG. 10 is a block diagram illustrating an example of a neural network (NN) 1000 that can be used for media processing operations. The neural network 1000 can include any type of deep network, such as a convolutional neural network (CNN), an autoencoder, a deep belief net (DBN), a Recurrent Neural Network (RNN), a Generative Adversarial Networks (GAN), and/or other type of neural network. The neural network 1000 may be an example of one of the trained ML model(s) 277, the trained ML model(s) 740, trained ML model(s) 940, one or more trained ML model(s) used in the process 1100, or a combination thereof. The neural network 1000 may used by the face detector 240, the profile identifier 245, the profile synthesized face identifier 250, the synthesized face generator 255, the image modifier 260, or a combination thereof.

An input layer 1010 of the neural network 1000 includes input data. The input data of the input layer 1010 can include data representing the pixels of one or more input image frames. In some examples, the input data of the input layer 1010 includes data representing the pixels of image data (e.g., an image captured by the image capture and processing system 100, the image 235 captured by the sensor(s) 230, an image captured by one of the cameras 330A-330D, an image captured by one of the cameras 430A-430D, the image 510, the input face 710, the input face 720, the FOV 815A, the identity input 910, the expression input 920, the image of operation 1105, the face of operation 1110, the synthesized face of operation 1120, or a combination thereof.

The images can include image data from an image sensor including raw pixel data (including a single color per pixel based, for example, on a Bayer filter) or processed pixel values (e.g., RGB pixels of an RGB image). The neural network 1000 includes multiple hidden layers 1012A, 1012B, through 1012N. The hidden layers 1012A, 1012B, through 1012N include "N" number of hidden layers, where "N" is an integer greater than or equal to one. The number of hidden layers can be made to include as many layers as needed for the given application. The neural network 1000 further includes an output layer 1014 that provides an output resulting from the processing performed by the hidden layers 1012A, 1012B, through 1012N.

In some examples, the output layer 1014 can provide an output image, such as the synthesized face(s) (e.g., generated by the synthesized face generator 255), the modified image 265, the synthesized face 530, the modified image 550, the synthesized face 730, the FOV 815B, the synthesized face 855, the synthesized face 930, the synthesized face 915, the combined face 930, the synthesized face of operation 1120, the modified image of operation 1125, or a combination thereof. In some examples, the output layer 1014 can provide other types of data as well, such as face detection data for the face detector 240, face recognition data for the face detector 240 and/or profile identifier 245, or a combination thereof.

The neural network 1000 is a multi-layer neural network of interconnected filters. Each filter can be trained to learn a feature representative of the input data. Information associated with the filters is shared among the different layers and each layer retains information as information is processed. In some cases, the neural network 1000 can include a feed-forward network, in which case there are no feedback connections where outputs of the network are fed back into itself. In some cases, the network 1000 can include a recurrent neural network, which can have loops that allow information to be carried across nodes while reading in input.

In some cases, information can be exchanged between the layers through node-to-node interconnections between the various layers. In some cases, the network can include a convolutional neural network, which may not link every node in one layer to every other node in the next layer. In networks where information is exchanged between layers, nodes of the input layer 1010 can activate a set of nodes in the first hidden layer 1012A. For example, as shown, each of the input nodes of the input layer 1010 can be connected to each of the nodes of the first hidden layer 1012A. The nodes of a hidden layer can transform the information of each input node by applying activation functions (e.g., filters) to this information. The information derived from the transformation can then be passed to and can activate the nodes of the next hidden layer 1012B, which can perform their own designated functions. Example functions include convolutional functions, downscaling, upscaling, data transformation, and/or any other suitable functions. The output of the hidden layer 1012B can then activate nodes of the next hidden layer, and so on. The output of the last hidden layer 1012N can activate one or more nodes of the output layer 1014, which provides a processed output image. In some cases, while nodes (e.g., node 1016) in the neural network 1000 are shown as having multiple output lines, a node has a single output and all lines shown as being output from a node represent the same output value.

In some cases, each node or interconnection between nodes can have a weight that is a set of parameters derived from the training of the neural network 1000. For example, an interconnection between nodes can represent a piece of information learned about the interconnected nodes. The interconnection can have a tunable numeric weight that can be tuned (e.g., based on a training dataset), allowing the neural network 1000 to be adaptive to inputs and able to learn as more and more data is processed.

The neural network 1000 is pre-trained to process the features from the data in the input layer 1010 using the different hidden layers 1012A, 1012B, through 1012N in order to provide the output through the output layer 1014.

Figure 11:
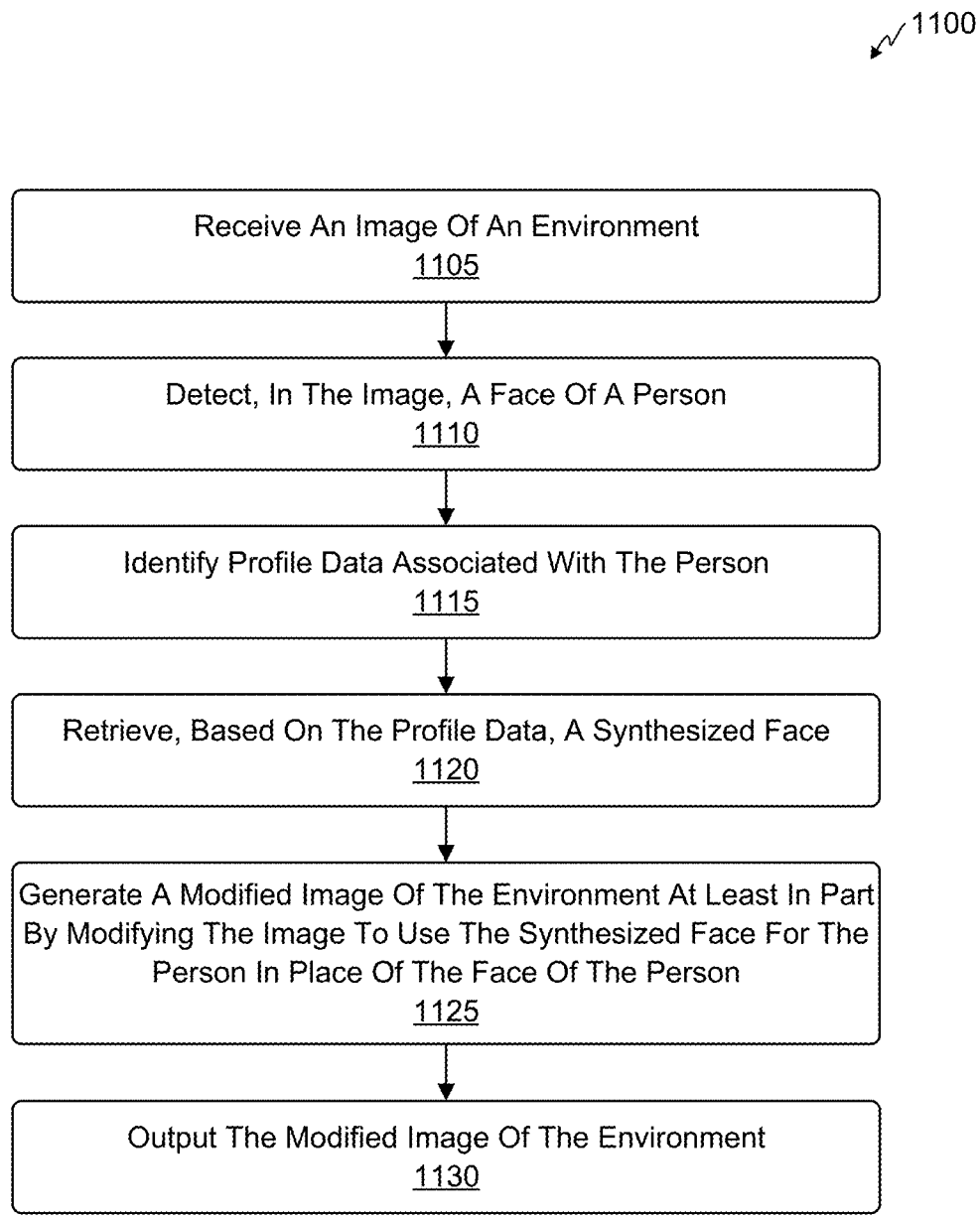
FIG. 11 is a flow diagram illustrating an imaging process, in accordance with some examples.

FIG. 11 is a flow diagram illustrating an imaging process 1100. The imaging process 1100 may be performed by an imaging system. In some examples, the imaging system can include, for example, the image capture and processing system 100, the image capture device 105A, the image processing device 105B, the image processor 150, the ISP 154, the host processor 152, the imaging system 200A, the imaging system 200B, the server(s) 205, the user device 210, the user device 220, the HMD 310, the mobile handset 410, the imaging system of FIG. 5, the imaging system(s) of FIGS. 6A-6D, the trained ML model(s) 740, the head-mounted apparatus 810, the the trained ML model(s) 940, neural network 1000, the computing system 1200, the processor 1210, or a combination thereof.

At operation 1105, the imaging system is configured to receive an image of an environment. In some aspects, at least a portion of the environment includes one or more virtual elements. For instance, the one or more virtual elements may be associated with an extended reality (XR) application or other application. In some cases, at least a portion of the image of the environment is captured by an image sensor (or multiple image sensors in some cases). In some examples, the imaging system includes an image sensor connector that couples and/or connects the image sensor(s) to a remainder of the imaging system (e.g., including the processor and/or the memory of the imaging system). In some examples, the imaging system receives the image data from the image sensor by receiving the image data from, over, and/or using the image sensor connector.

Examples of the image sensor includes the image sensor 130, the sensor(s) 230, the first camera 330A, the second camera 330B, the third camera 330C, the fourth camera 330D, the first camera 430A, the second camera 430B, the third camera 430C, the fourth camera 430D, an image sensor that captures the image 510, an image sensor used to capture an image used as input data for the input layer 1010 of the NN 1000, the input device 1245, another image sensor described herein, another sensor described herein, or a combination thereof.

Examples of the image data include image data captured using the image capture and processing system 100, the image 235 captured using image sensor(s) of the sensor(s) 230, image data captured using the first camera 330A, image data captured using the second camera 330B, image data captured using the third camera 330C, image data captured using the fourth camera 330D, image data captured using the first camera 430A, image data captured using the second camera 430B, image data captured using the third camera 430C, image data captured using the fourth camera 430D, the image 510, the FOV 815A, an image used as input data for the input layer 1010 of the NN 1000, an image captured using the input device 1245, another image described herein, another set of image data described herein, or a combination thereof.

At operation 1110, the imaging system is configured to detect, in the image, a face of a person. At operation 1115, the imaging system is configured to identify profile data associated with the person. In one illustrative example, the profile data does not match a stored profile of a person in a memory of the imaging system or an external memory to which the imaging system has access (e.g., which may indicate that the person is unknown to the imaging system). In another illustrative example, the profile data may indicate one or more privacy settings for the person. In some cases, to identify the profile data associated with the person, the imaging system is configured to determine an identity of the face of the person in the image using facial recognition. In some cases, to identify the profile data associated with the person, the imaging system is configured to identify the profile data associated with the person based on one or more communications from a user device associated with the person.

At operation 1120, the imaging system is configured to retrieve, based on the profile data, a synthesized face. In some examples, the synthesized face is generated to be distinct from any face of any known real person. In some cases, the synthesized face is generated to have a skin tone that matches a skin tone of the person. In some aspects, the imaging system is configured to generate the synthesized face before retrieving the synthesized face corresponding to the person from the profile data. For instance, to generate the synthesized face, the imaging system may use a trained machine learning model (e.g., a generative adversarial network (GAN) or other trained machine learning model) that combines attributes from a plurality of different images of a plurality of different faces into the synthesized face. In some aspects, the imaging system is configured to re-generate the synthesized face. In some cases, the synthesized face changes in appearance upon being re-generated.

At operation 1125, the imaging system is configured to generate a modified image of the environment at least in part by modifying the image to use the synthesized face for the person in place of the face of the person. In some aspects, to generate the modified image, the imaging system is configured to use the synthesized face and at least a portion of the image as inputs to a trained machine learning model that modifies the image to use the synthesized face for the person in place of the face of the person. In some cases, to generate the modified image, the imaging system is configured to modify a first skin tone of a portion of the person in the image to correspond to a second skin tone of the synthesized face for the person.

In some aspects, the imaging system is configured to detect, in the image, a second face of a second person. The imaging system is further configured to identify second profile data associated with the second person, such as based on a second identity of the second face of the second person in the image. In some cases, the second profile data does not match a stored profile of a person in the at least one memory. In some cases, the second profile data indicates one or more privacy settings for the second person. The imaging system is configured to determine, based on the second profile data associated with the second person, that second face of the second person is not to be modified in the modified image. In such aspects, to generate the modified image, the imaging system is configured to leave the second face of the second person unmodified in the image in addition to modifying the image to use the synthesized face for the person in place of the face of the person.

In some examples, the imaging system is configured to detect, in the image, a second face of a second person. The imaging system is further configured to identify second profile data associated with the second person, such as based on a second identity of the second face of the second person in the image. In some cases, the second profile data does not match a stored profile of a person in the at least one memory. In some cases, the second profile data indicates one or more privacy settings for the second person. The imaging system is configured to retrieve, based on the second profile data, a second synthesized face that corresponds to the second person and is distinct from the second face of the second person. In such aspects, to generate the modified image, the imaging system is configured to modify the image to use the second synthesized face for the second person in place of the second face of the second person in addition to modifying the image to use the synthesized face for the person in place of the face of the person.

In some cases, the imaging system is configured to identify a head pose of a head of the person in the image. In some cases, to modify the image to use the synthesized face for the person in place of the face of the person, the imaging system is configured to orient the synthesized face for the person according to the head pose of the head of the person in the image.

In some aspects, the imaging system is configured to identify a lighting condition in the environment in the image. In some cases, to modify the image to use the synthesized face for the person in place of the face of the person, the imaging system is configured to illuminate the synthesized face for the person according to the lighting condition in the environment in the image.

In some examples, the imaging system is configured to identify, from the profile data, at least one privacy setting associated with the person in the image. In some cases, the at least one privacy setting indicates that output of the face of the person is to be avoided. In some examples, the imaging system is configured to modify the image to use the synthesized face for the person in place of the face of the person in response to identifying the at least one privacy setting that indicates that output of the face of the person is to be avoided. In some cases, the imaging system is configured to determine that a predetermined condition is active. In some cases, the at least one privacy setting indicates that output of the face of the person is to be avoided while the predetermined condition is active. In some examples, the predetermined condition is associated with a location of the person in the environment, an identity of a viewer of the environment, a time of day, any combination thereof, or other condition.

In some aspects, the imaging system is configured to identify an expression on the face of the person in the image. The imaging system is configured to modify the synthesized face before generating the modified image based on a combination of an identity of the synthesized face with the expression identified on the face of the person in the image.

At operation 1130, the imaging system is configured to output the modified image of the environment. In some examples, the imaging system includes a display, and outputting the modified image data includes displaying the modified image data using the display. Examples of the display include the output device(s) 270A-270B, the display(s) 340 of the HMD 310, the display 440 of the mobile handset 410, the output device 1235, or a combination thereof. In some examples, the imaging system includes a communication interface, and outputting the modified image data includes sending or transmitting the modified image to at least a recipient device using at least the communication interface. In some examples, the imaging system is configured to receive the image from an image sensor of the imaging system, and the imaging system is configured to output the modified image using an output device of the imaging system. In such examples, the imaging system may include an XR device (e.g., an AR HMD, VR HMD, etc.), mobile handset or device, wireless communication device, or other computing device. In some examples, the imaging system is configured to receive the image from a user device over a network, and the imaging system is configured to send the modified image to the user device over the network. In such examples, the imaging system may include one or more servers that are communicatively coupled to the user device over the network.

In some examples, the imaging system can includes: means for receiving an image of an environment; means for detecting, in the image, a face of a person; means for identifying profile data associated with the person; means for retrieving, based on the profile data, a synthesized face; means for generating a modified image of the environment at least in part by modifying the image to use the synthesized face for the person in place of the face of the person; and means for outputting the modified image of the environment. In some examples, the means may include one or more of the image capture and processing system 100, the image capture device 105A, the image processing device 105B, the image processor 150, the ISP 154, the host processor 152, the image sensor 130, the sensor(s) 230, the first camera 330A, the second camera 330B, the third camera 330C, the fourth camera 330D, the first camera 430A, the second camera 430B, the third camera 430C, the fourth camera 430D, an image sensor that captures the image 510, an image sensor used to capture an image used as input data for the input layer 1010 of the NN 1000, the input device 1245, another image sensor described herein, another sensor described herein, or a combination thereof.

In some examples, the processes described herein (e.g., the processes of FIG. 1, FIGS. 2A-2B, 5, 6A-6D, 7, 8A-8B, 9, 10, the process 1100 of FIG. 11, and/or other processes described herein) may be performed by a computing device or apparatus. In some examples, the processes described herein can be performed by the image capture and processing system 100, the image capture device 105A, the image processing device 105B, the image processor 150, the ISP 154, the host processor 152, the imaging system 200A, the imaging system 200B, the server(s) 205, the user device 210, the user device 220, the HMD 310, the mobile handset 410, the imaging system of FIG. 5, the imaging system(s) of FIGS. 6A-6D, the trained ML model(s) 740, the head-mounted apparatus 810, the trained ML model(s) 940, neural network 1000, the computing system 1200, the processor 1210, or a combination thereof.

The computing device can include any suitable device, such as a mobile device or wireless communication device (e.g., a mobile phone or other mobile handset), a desktop computing device, a tablet computing device, an extended reality (XR) device (e.g., a VR headset or HMD, an AR headset or HMD, AR glasses or HMD, etc.), a wearable device (e.g., a network-connected watch or smartwatch, or other wearable device), a server computer, an autonomous vehicle or computing device of an autonomous vehicle, a robotic device, a television, and/or any other computing device with the resource capabilities to perform the processes described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes described herein are illustrated as logical flow diagrams, block diagrams, or conceptual diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 12:
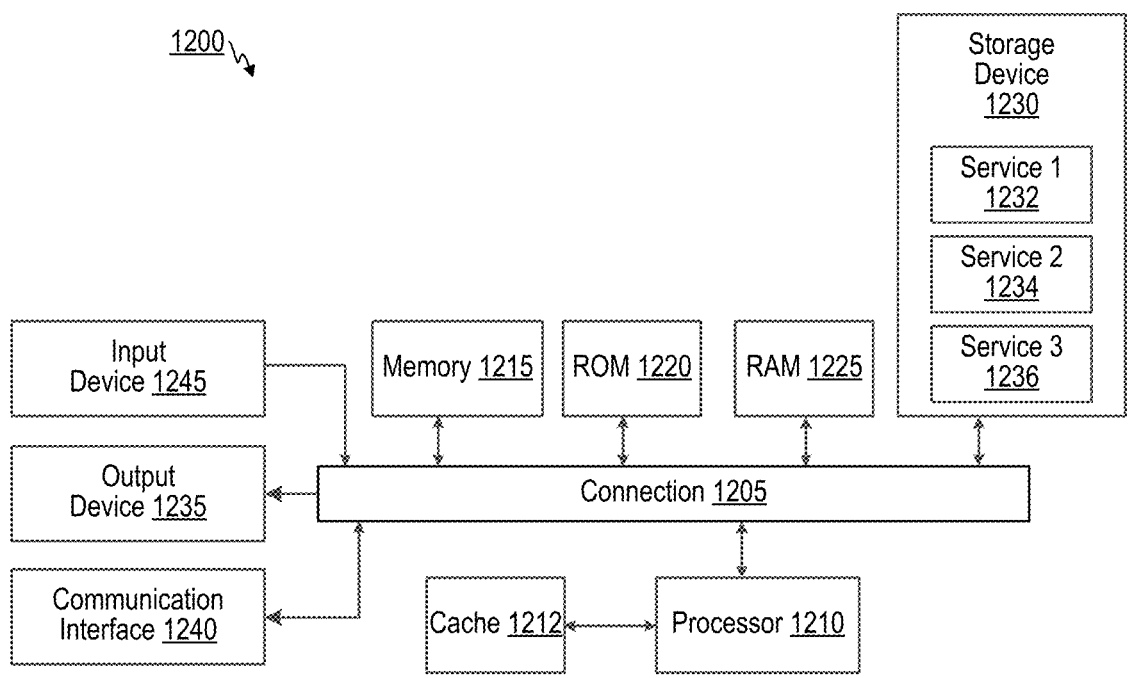
FIG. 12 is a diagram illustrating an example of a computing system for implementing certain aspects described herein.

FIG. 12 is a diagram illustrating an example of a system for implementing certain aspects of the present technology. In particular, FIG. 12 illustrates an example of computing system 1200, which can be for example any computing device making up internal computing system, a remote computing system, a camera, or any component thereof in which the components of the system are in communication with each other using connection 1205. Connection 1205 can be a physical connection using a bus, or a direct connection into processor 1210, such as in a chipset architecture. Connection 1205 can also be a virtual connection, networked connection, or logical connection.

In some aspects, computing system 1200 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 1200 includes at least one processing unit (CPU or processor) 1210 and connection 1205 that couples various system components including system memory 1215, such as read-only memory (ROM) 1220 and random access memory (RAM) 1225 to processor 1210. Computing system 1200 can include a cache 1212 of high-speed memory connected directly with, in close proximity to, or integrated as part of processor 1210.

Processor 1210 can include any general purpose processor and a hardware service or software service, such as services 1232, 1234, and 1236 stored in storage device 1230, configured to control processor 1210 as well as a special-purpose processor where software instructions are incorporated into the actual processor design. Processor 1210 may essentially be a completely self-contained computing system, containing multiple cores or processors, a bus, memory controller, cache, etc. A multi-core processor may be symmetric or asymmetric.

To enable user interaction, computing system 1200 includes an input device 1245, which can represent any number of input mechanisms, such as a microphone for speech, a touch-sensitive screen for gesture or graphical input, keyboard, mouse, motion input, speech, etc. Computing system 1200 can also include output device 1235, which can be one or more of a number of output mechanisms. In some instances, multimodal systems can enable a user to provide multiple types of input/output to communicate with computing system 1200. Computing system 1200 can include communications interface 1240, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 1202.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1240 may also include one or more Global Navigation Satellite System (GNSS) receivers or transceivers that are used to determine a location of the computing system 1200 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1230 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1230 can include software services, servers, services, etc., that when the code that defines such software is executed by the processor 1210, it causes the system to perform a function. In some aspects, a hardware service that performs a particular function can include the software component stored in a computer-readable medium in connection with the necessary hardware components, such as processor 1210, connection 1205, output device 1235, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some aspects, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on.

Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the disclosure include:

Aspect 1. An apparatus for processing one or more images, the apparatus comprising: at least one memory; and one or more processors coupled to the at least one memory, the one or more processors configured to: receive an image of an environment; detect, in the image, a face of a person; identify profile data associated with the person; retrieve, based on the profile data, a synthesized face; generate a modified image of the environment at least in part by modifying the image to use the synthesized face for the person in place of the face of the person; and output the modified image of the environment.

Aspect 2. The apparatus of Aspect 1, wherein the synthesized face is generated to be distinct from any face of any known real person.

Aspect 3. The apparatus of any of Aspects 1 to 2, wherein, to generate the modified image, the one or more processors are configured to use the synthesized face and at least a portion of the image as inputs to a trained machine learning model that modifies the image to use the synthesized face for the person in place of the face of the person.

Aspect 4. The apparatus of any of Aspects 1 to 3, wherein the profile data does not match a stored profile of a person in the at least one memory.

Aspect 5. The apparatus of any of Aspects 1 to 4, wherein the profile data indicates one or more privacy settings for the person.

Aspect 6. The apparatus of any of Aspects 1 to 5, wherein, to identify the profile data associated with the person, the one or more processors are configured to determine an identity of the face of the person in the image using facial recognition.

Aspect 7. The apparatus of any of Aspects 1 to 6, wherein, to identify the profile data associated with the person, the one or more processors are configured to identify the profile data associated with the person based on one or more communications from a user device associated with the person.

Aspect 8. The apparatus of any of Aspects 1 to 7, wherein the one or more processors are configured to: detect, in the image, a second face of a second person; identify, based on a second identity of the second face of the second person in the image, second profile data associated with the second person; and determine, based on the second profile data associated with the second person, that second face of the second person is not to be modified in the modified image, wherein to generate the modified image, the one or more processors are configured to leave the second face of the second person unmodified in the image in addition to modifying the image to use the synthesized face for the person in place of the face of the person.

Aspect 9. The apparatus of Aspect 8, wherein the second profile data does not match a stored profile of a person in the at least one memory.

Aspect 10. The apparatus of Aspect 8, wherein the second profile data indicates one or more privacy settings for the second person.

Aspect 11. The apparatus of any of Aspects 1 to 10, wherein the one or more processors are configured to: detect, in the image, a second face of a second person; identify, based on a second identity of the second face of the second person in the image, second profile data associated with the second person; and retrieve, based on the second profile data, a second synthesized face that corresponds to the second person and is distinct from the second face of the second person, wherein, to generate the modified image, the one or more processors are configured to modify the image to use the second synthesized face for the second person in place of the second face of the second person in addition to modifying the image to use the synthesized face for the person in place of the face of the person.

Aspect 12. The apparatus of any of Aspects 1 to 11, wherein the one or more processors are configured to: generate the synthesized face before retrieving the synthesized face corresponding to the person from the profile data, wherein, to generate the synthesized face, the one or more processors are configured to use a trained machine learning model that combines attributes from a plurality of different images of a plurality of different faces into the synthesized face.

Aspect 13. The apparatus of Aspect 12, wherein the trained machine learning model is a generative adversarial network.

Aspect 14. The apparatus of any of Aspects 1 to 13, wherein the one or more processors are configured to re-generate the synthesized face, wherein the synthesized face changes in appearance upon being re-generated.

Aspect 15. The apparatus of any of Aspects 1 to 14, wherein the synthesized face is generated to have a skin tone that matches a skin tone of the person.

Aspect 16. The apparatus of any of Aspects 1 to 15, wherein, to generate the modified image, the one or more processors are configured to modify a first skin tone of a portion of the person in the image to correspond to a second skin tone of the synthesized face for the person.

Aspect 17. The apparatus of any of Aspects 1 to 16, wherein the one or more processors are configured to: identify a head pose of a head of the person in the image, wherein, to modify the image to use the synthesized face for the person in place of the face of the person, the one or more processors are configured to orient the synthesized face for the person according to the head pose of the head of the person in the image.

Aspect 18. The apparatus of any of Aspects 1 to 17, wherein the one or more processors are configured to: identify a lighting condition in the environment in the image, wherein, to modify the image to use the synthesized face for the person in place of the face of the person, the one or more processors are configured to illuminate the synthesized face for the person according to the lighting condition in the environment in the image.

Aspect 19. The apparatus of any of Aspects 1 to 18, wherein the one or more processors are configured to: identify, from the profile data, at least one privacy setting associated with the person in the image, wherein the at least one privacy setting indicates that output of the face of the person is to be avoided, wherein the one or more processors are configured to modify the image to use the synthesized face for the person in place of the face of the person in response to identifying the at least one privacy setting that indicates that output of the face of the person is to be avoided.

Aspect 20. The apparatus of Aspect 19, wherein the one or more processors are configured to: determine that a predetermined condition is active, wherein the at least one privacy setting indicates that output of the face of the person is to be avoided while the predetermined condition is active, wherein the predetermined condition is associated with at least one of a location of the person in the environment or an identity of a viewer of the environment.

Aspect 21. The apparatus of any of Aspects 1 to 20, wherein the one or more processors are configured to: identify an expression on the face of the person in the image; and modify the synthesized face before generating the modified image based on a combination of an identity of the synthesized face with the expression identified on the face of the person in the image.

Aspect 22. The apparatus of any of Aspects 1 to 21, wherein at least a portion of the image of the environment is captured by an image sensor.

Aspect 23. The apparatus of any of Aspects 1 to 22, wherein at least a portion of the environment includes one or more virtual elements.

Aspect 24. The apparatus of Aspect 23, wherein the one or more virtual elements are associated with an extended reality (XR) application.

Aspect 25. The apparatus of any of Aspects 1 to 24, further comprising: a display, wherein, to output the modified image, the one or more processors are configured to display the modified image using at least the display.

Aspect 26. The apparatus of any of Aspects 1 to 25, further comprising: a communication interface, wherein, to output the modified image, the one or more processors are configured to send the modified image to at least a recipient device using at least the communication interface.

Aspect 27. The apparatus of any of Aspects 1 to 26, wherein the one or more processors are configured to receive the image from an image sensor of the apparatus, wherein the one or more processors are configured to output the modified image using an output device of the apparatus, and wherein the apparatus includes at least one of a head-mounted display (HMD), a mobile handset, or a wireless communication device.

Aspect 28. The apparatus of any of Aspects 1 to 27, wherein the one or more processors are configured to receive the image from a user device over a network, wherein the one or more processors are configured to send the modified image to the user device over the network, and wherein the apparatus includes one or more servers that are communicatively coupled to the user device over the network.

Aspect 29. A method of processing one or more images, the method comprising: receiving an image of an environment; detecting, in the image, a face of a person; identifying profile data associated with the person; retrieving, based on the profile data, a synthesized face; generating a modified image of the environment at least in part by modifying the image to use the synthesized face for the person in place of the face of the person; and outputting the modified image of the environment.

Aspect 30. The method of Aspect 29, wherein the synthesized face is generated to be distinct from any face of any known real person.

Aspect 31. The method of any of Aspects 29 to 30, wherein generating the modified image includes using the synthesized face and at least a portion of the image as inputs to a trained machine learning model that modifies the image to use the synthesized face for the person in place of the face of the person.

Aspect 32. The method of any of Aspects 29 to 31, wherein the profile data does not match a stored profile of a person in at least one memory.

Aspect 33. The method of any of Aspects 29 to 32, wherein the profile data indicates one or more privacy settings for the person.

Aspect 34. The method of any of Aspects 29 to 33, wherein identifying the profile data associated with the person includes determining an identity of the face of the person in the image using facial recognition.

Aspect 35. The method of any of Aspects 29 to 34, wherein identifying the profile data associated with the person includes identifying the profile data associated with the person based on one or more communications from a user device associated with the person.

Aspect 36. The method of any of Aspects 29 to 35, further comprising: detecting, in the image, a second face of a second person; identifying, based on a second identity of the second face of the second person in the image, second profile data associated with the second person; and determining, based on the second profile data associated with the second person, that second face of the second person is not to be modified in the modified image, wherein generating the modified image includes leaving the second face of the second person unmodified in the image in addition to modifying the image to use the synthesized face for the person in place of the face of the person.

Aspect 37. The method of Aspect 36, wherein the second profile data does not match a stored profile of a person in the at least one memory.

Aspect 38. The method of Aspect 36, wherein the second profile data indicates one or more privacy settings for the second person.

Aspect 39. The method of any of Aspects 29 to 38, further comprising: detecting, in the image, a second face of a second person; identifying, based on a second identity of the second face of the second person in the image, second profile data associated with the second person; and retrieving, based on the second profile data, a second synthesized face that corresponds to the second person and is distinct from the second face of the second person, wherein generating the modified image includes modifying the image to use the second synthesized face for the second person in place of the second face of the second person in addition to modifying the image to use the synthesized face for the person in place of the face of the person.

Aspect 40. The method of any of Aspects 29 to 39, further comprising: generating the synthesized face before retrieving the synthesized face corresponding to the person from the profile data, wherein, to generate the synthesized face, the one or more processors are configured to use a trained machine learning model that combines attributes from a plurality of different images of a plurality of different faces into the synthesized face.

Aspect 41. The method of Aspect 40, wherein the trained machine learning model is a generative adversarial network.

Aspect 42. The method of any of Aspects 29 to 41, further comprising re-generating the synthesized face, wherein the synthesized face changes in appearance upon being re-generated.

Aspect 43. The method of any of Aspects 29 to 42, wherein the synthesized face is generated to have a skin tone that matches a skin tone of the person.

Aspect 44. The method of any of Aspects 29 to 43, wherein generating the modified image includes modifying a first skin tone of a portion of the person in the image to correspond to a second skin tone of the synthesized face for the person.

Aspect 45. The method of any of Aspects 29 to 44, further comprising: identifying a head pose of a head of the person in the image, wherein modifying the image to use the synthesized face for the person in place of the face of the person includes orienting the synthesized face for the person according to the head pose of the head of the person in the image.

Aspect 46. The method of any of Aspects 29 to 45, further comprising: identifying a lighting condition in the environment in the image, wherein modifying the image to use the synthesized face for the person in place of the face of the person includes illuminating the synthesized face for the person according to the lighting condition in the environment in the image.

Aspect 47. The method of any of Aspects 29 to 46, further comprising: identifying, from the profile data, at least one privacy setting associated with the person in the image, wherein the at least one privacy setting indicates that output of the face of the person is to be avoided; and modifying the image to use the synthesized face for the person in place of the face of the person in response to identifying the at least one privacy setting that indicates that output of the face of the person is to be avoided.

Aspect 48. The method of any of Aspects 29 to 47, further comprising: determining that a predetermined condition is active, wherein the at least one privacy setting indicates that output of the face of the person is to be avoided while the predetermined condition is active, wherein the predetermined condition is associated with at least one of a location of the person in the environment or an identity of a viewer of the environment.

Aspect 49. The method of any of Aspects 29 to 48, further comprising: identifying an expression on the face of the person in the image; and modifying the synthesized face before generating the modified image based on a combination of an identity of the synthesized face with the expression identified on the face of the person in the image.

Aspect 50. The method of any of Aspects 29 to 49, wherein at least a portion of the image of the environment is captured by an image sensor.

Aspect 51. The method of any of Aspects 29 to 50, wherein at least a portion of the environment includes one or more virtual elements.

Aspect 52. The apparatus of Aspect 51, wherein the one or more virtual elements are associated with an extended reality (XR) application.

Aspect 53. The method of any of Aspects 29 to 52, wherein outputting the modified image includes displaying the modified image using at least one display.

Aspect 54. The method of any of Aspects 29 to 53, wherein outputting the modified image includes sending the modified image to at least one recipient device using at least one communication interface.

Aspect 55. The method of any of Aspects 29 to 54, further comprising: receiving the image from an image sensor; and outputting the modified image using an output device.

Aspect 56. The method of any of Aspects 29 to 55, further comprising: receiving the image from a user device over a network; and sending the modified image to the user device over the network.

Aspect 57: A non-transitory computer-readable medium is provided that has stored thereon instructions that, when executed by one or more processors, cause the one or more processors to perform operations according to any of Aspects 1 to 56.

Aspect 58: An apparatus for processing one or more images, comprising one or more means for performing operations according to any of Aspects 1 to 56.

What is claimed is:

1. An apparatus for processing one or more images, the apparatus comprising:
at least one memory; and
one or more processors coupled to the at least one memory, the one or more processors configured to:
receive image data depicting an environment, the image data including one or more images;
detect, in the image data, a first face of a first person;
identify first profile data associated with the first person;
detect, in the image data, a second face of a second person;
identify second profile data associated with the second person;
generate, based on the first profile data and the second profile data, a modified image of the environment by replacing an area depicting the first face in an image of the image data with a synthesized face that is distinct from the first face, wherein the modified image depicts the second face; and
output the modified image of the environment.

2. The apparatus of claim 1, wherein to generate the modified image, the one or more processors are configured to use the synthesized face and at least a portion of the image of the image data as inputs to a trained machine learning model.

3. The apparatus of claim 1, wherein the first profile data does not match a stored profile of a person in the at least one memory.

4. The apparatus of claim 1, wherein the first profile data indicates one or more privacy settings for the first person.

5. The apparatus of claim 1, wherein to identify the first profile data associated with the first person, the one or more processors are configured to determine an identity of the first person based on the image data.

6. The apparatus of claim 1, wherein to identify the first profile data associated with the first person, the one or more processors are configured to identify the first profile data associated with the first person based on one or more communications from a user device associated with the first person.

7. The apparatus of claim 1, wherein the one or more processors are configured to:
determine, based on the second profile data, that the second face of the second person is not to be modified in the modified image.

8. The apparatus of claim 7, wherein the second profile data does not match a stored profile of a person in the at least one memory.

9. The apparatus of claim 7, wherein the second profile data indicates one or more privacy settings for the second person.

10. The apparatus of claim 1, wherein the one or more processors are configured to:
retrieve the synthesized face based on the first profile data; and
generate the synthesized face before retrieving the synthesized face, wherein to generate the synthesized face, the one or more processors are configured to use a trained machine learning model that combines attributes from a plurality of different images of a plurality of different faces into the synthesized face.

11. The apparatus of claim 1, wherein the one or more processors are configured to re-generate the synthesized face, wherein the synthesized face changes in appearance upon being re-generated.

12. The apparatus of claim 1, wherein the synthesized face has a skin tone that matches a skin tone of the first person in the modified image.

13. The apparatus of claim 12, wherein to generate the modified image, the one or more processors are configured to modify a first skin tone of a portion of the first person in the image data to correspond to a second skin tone of the synthesized face.

14. The apparatus of claim 1, wherein the one or more processors are configured to:
identify a head pose of a head of the first person in the image data, wherein to generate the modified image, the one or more processors are configured to orient the synthesized face according to the head pose.

15. The apparatus of claim 1, wherein the one or more processors are configured to:
identify, from the first profile data, at least one privacy setting associated with the first person, wherein the at least one privacy setting indicates that output of the face of the first person is to be avoided, wherein the one or more processors are configured to generate the modified face in response to identifying the at least one privacy setting.

16. The apparatus of claim 1, wherein the one or more processors are configured to:
identify an expression on the face of the first person in the image data; and
modify the synthesized face before generating the modified image based on the expression.

17. The apparatus of claim 1, further comprising:
a display, wherein to output the modified image, the one or more processors are configured to display the modified image using at least the display.

18. The apparatus of claim 1, further comprising:
a communication interface, wherein to output the modified image, the one or more processors are configured to send the modified image to at least a recipient device using at least the communication interface.

19. The apparatus of claim 1, wherein the one or more processors are configured to receive the image data from an image sensor of the apparatus, wherein the one or more processors are configured to output the modified image using an output device of the apparatus, and wherein the apparatus includes at least one of a head-mounted display (HMD), a mobile handset, or a wireless communication device.

20. The apparatus of claim 1, wherein the one or more processors are configured to receive the image data from a user device over a network, wherein the one or more processors are configured to send the modified image to the user device over the network, and wherein the apparatus includes one or more servers that are communicatively coupled to the user device over the network.

21. The apparatus of claim 1, wherein the one or more processors are configured to replace the area depicting the first face in the image of the image data with the synthesized face using an inpainting process.

22. A method of processing one or more images, the method comprising:
receiving image data depicting an environment, the image data including one or more images;
detecting, in the image data, a first face of a first person;
identifying first profile data associated with the first person;
detecting, in the image data, a second face of a second person;
identifying second profile data associated with the second person;
generating, based on the first profile data and the second profile data, a modified image of the environment by replacing an area depicting the first face in an image of the image data with a synthesized face that is distinct from the first face, wherein the modified image depicts the second face; and
outputting the modified image of the environment.

23. The method of claim 22, wherein generating the modified image includes using the synthesized face and at least a portion of the image of the image data as inputs to a trained machine learning model.

24. The method of claim 22, wherein the first profile data does not match a stored profile of a person in at least one memory.

25. The method of claim 22, wherein the first profile data indicates one or more privacy settings for the first person.

26. The method of claim 22, wherein identifying the first profile data associated with the first person includes determining an identity of the first person in based on the image data.

27. The method of claim 22, wherein identifying the first profile data associated with the first person includes identifying the first profile data associated with the first person based on one or more communications from a user device associated with the first person.

28. The method of claim 22, further comprising:
determining, based on the second profile data, that the second face of the second person is not to be modified in the modified image.

29. The method of claim 22, further comprising:
identifying, from the first profile data, at least one privacy setting associated with the first person, wherein the at least one privacy setting indicates that output of the face of the first person is to be avoided; and generating the modified face in response to identifying the at least one privacy setting.

30. The method of claim 22, wherein generating the modified image includes replacing the area depicting the first face in the image of the image data with the synthesized face using an inpainting process.

* * * * *